(12) United States Patent
Tahir et al.

(10) Patent No.: US 10,655,946 B2
(45) Date of Patent: May 19, 2020

(54) AUTOMATED ROTATION MECHANISM FOR SPHERICALLY MOUNTED RETROREFLECTOR

(71) Applicant: FARO Technologies, Inc., Lake Mary, FL (US)

(72) Inventors: Muhammad Umair Tahir, Stuttgart (DE); Oliver Zweigle, Stuttgart (DE); Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/259,423

(22) Filed: Jan. 28, 2019

(65) Prior Publication Data

US 2019/0249980 A1 Aug. 15, 2019

Related U.S. Application Data

(60) Provisional application No. 62/629,246, filed on Feb. 12, 2018.

(51) Int. Cl.
| | |
|---|---|
| *G01B 11/03* | (2006.01) |
| *G01B 11/00* | (2006.01) |
| *G01B 5/004* | (2006.01) |
| *G01S 7/497* | (2006.01) |
| *G01S 17/66* | (2006.01) |
| *G02B 5/132* | (2006.01) |
| *G02B 5/122* | (2006.01) |
| *G01S 17/42* | (2006.01) |
| *G01S 7/481* | (2006.01) |

(52) U.S. Cl.
CPC ............ *G01B 11/005* (2013.01); *G01B 5/004* (2013.01); *G01B 11/03* (2013.01); *G01S 7/481* (2013.01); *G01S 7/497* (2013.01); *G01S 17/42* (2013.01); *G01S 17/66* (2013.01); *G02B 5/122* (2013.01); *G02B 5/132* (2013.01); *G01B 2210/58* (2013.01)

(58) Field of Classification Search
CPC ...... G01B 11/005; G01B 5/004; G01B 11/03; G01S 7/481; G01S 7/497; G01S 17/42; G01S 17/66; G02B 5/122; G02B 5/132
USPC ........................................................ 356/614
See application file for complete search history.

(56) References Cited

U.S. PATENT DOCUMENTS

| | | | |
|---|---|---|---|
| 6,964,113 B2 | 11/2005 | Bridges et al. | |
| 7,248,374 B2 * | 7/2007 | Bridges ............... | G01B 11/002 356/139.08 |
| 7,583,375 B2 | 9/2009 | Cramer et al. | |
| 7,804,602 B2 | 9/2010 | Raab | |
| 8,051,575 B2 | 11/2011 | Bridges et al. | |

(Continued)

FOREIGN PATENT DOCUMENTS

WO 2015088713 A1 6/2015

OTHER PUBLICATIONS

Extended European Search Report for Application No. 19156355.0 dated Jul. 16, 2019; 8 pgs. FAO0801EP.

(Continued)

*Primary Examiner* — Roy M Punnoose
(74) *Attorney, Agent, or Firm* — Cantor Colburn LLP

(57) ABSTRACT

An apparatus includes a kinematic nest that supports an element having a spherical surface, a rotation mechanism that rotates the element, and processor that activates the rotation mechanism.

21 Claims, 32 Drawing Sheets

(56) References Cited

U.S. PATENT DOCUMENTS

| | | | |
|---|---|---|---|
| RE44,150 E * | 4/2013 | Cramer | G01C 15/002 356/154 |
| 8,612,174 B2 * | 12/2013 | Madhavan | G01B 11/007 702/153 |
| 8,670,114 B2 | 3/2014 | Bridges et al. | |
| 8,947,678 B2 | 2/2015 | Bridges | |
| 9,074,869 B2 * | 7/2015 | Bridges | G01C 15/002 |
| 9,121,689 B2 * | 9/2015 | Bridges | G01S 17/66 |
| 9,239,238 B2 | 1/2016 | Bridges | |
| 9,329,028 B2 | 5/2016 | Bridges et al. | |
| 9,347,767 B2 | 5/2016 | Bridges | |
| 9,423,492 B2 | 8/2016 | Bridges | |
| 9,476,695 B2 | 10/2016 | Becker et al. | |
| 2003/0227616 A1 * | 12/2003 | Bridges | G01B 11/002 356/139.06 |
| 2012/0059624 A1 * | 3/2012 | Madhavan | G01B 11/007 702/153 |
| 2014/0098383 A1 * | 4/2014 | Bridges | G01C 15/002 356/614 |
| 2014/0313521 A1 * | 10/2014 | Bridges | G01S 17/66 356/614 |
| 2018/0216923 A1 * | 8/2018 | Creachbaum | G01B 5/008 |

OTHER PUBLICATIONS

Wanli Liu et al: "CAD-directed Inspection Planning for Laser Guided Measurement Robot" Computer-Aided Design and Computer Graphics, 2007 10th IEEE International Conference on, IEEE, PI Oct. 1, 2007, pp. 252-257, XP031193787.

* cited by examiner

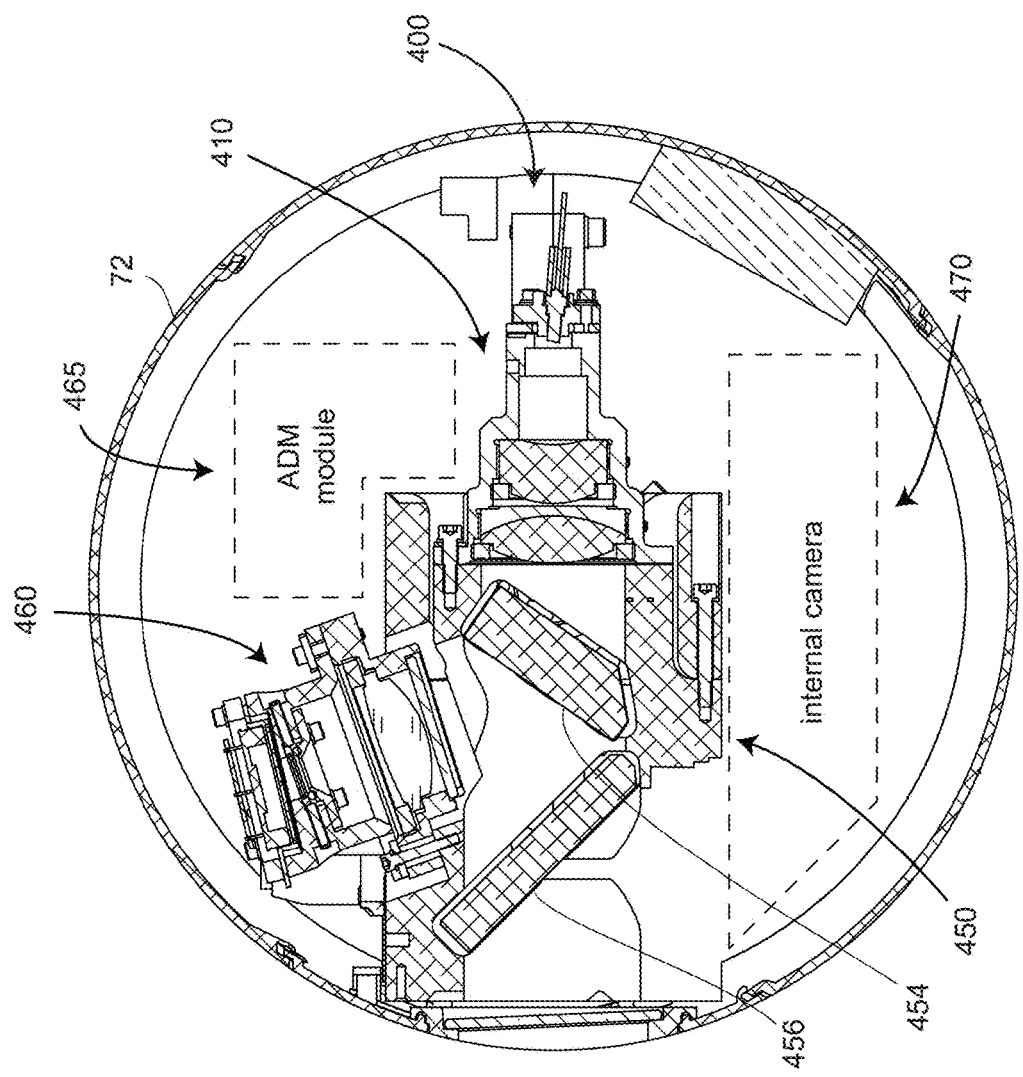
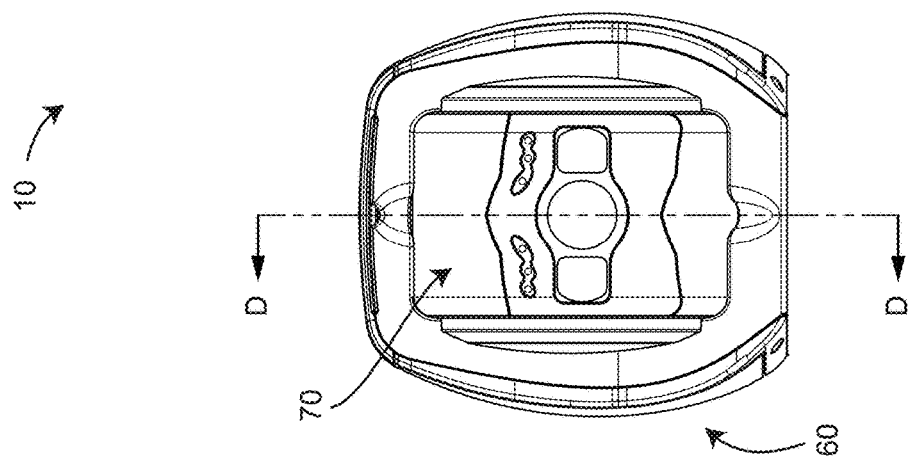

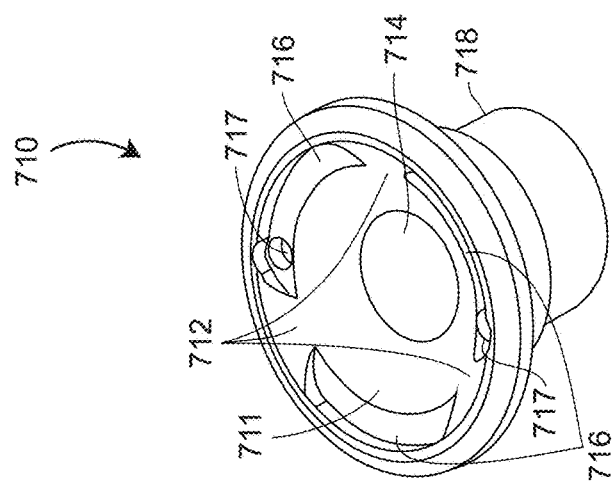
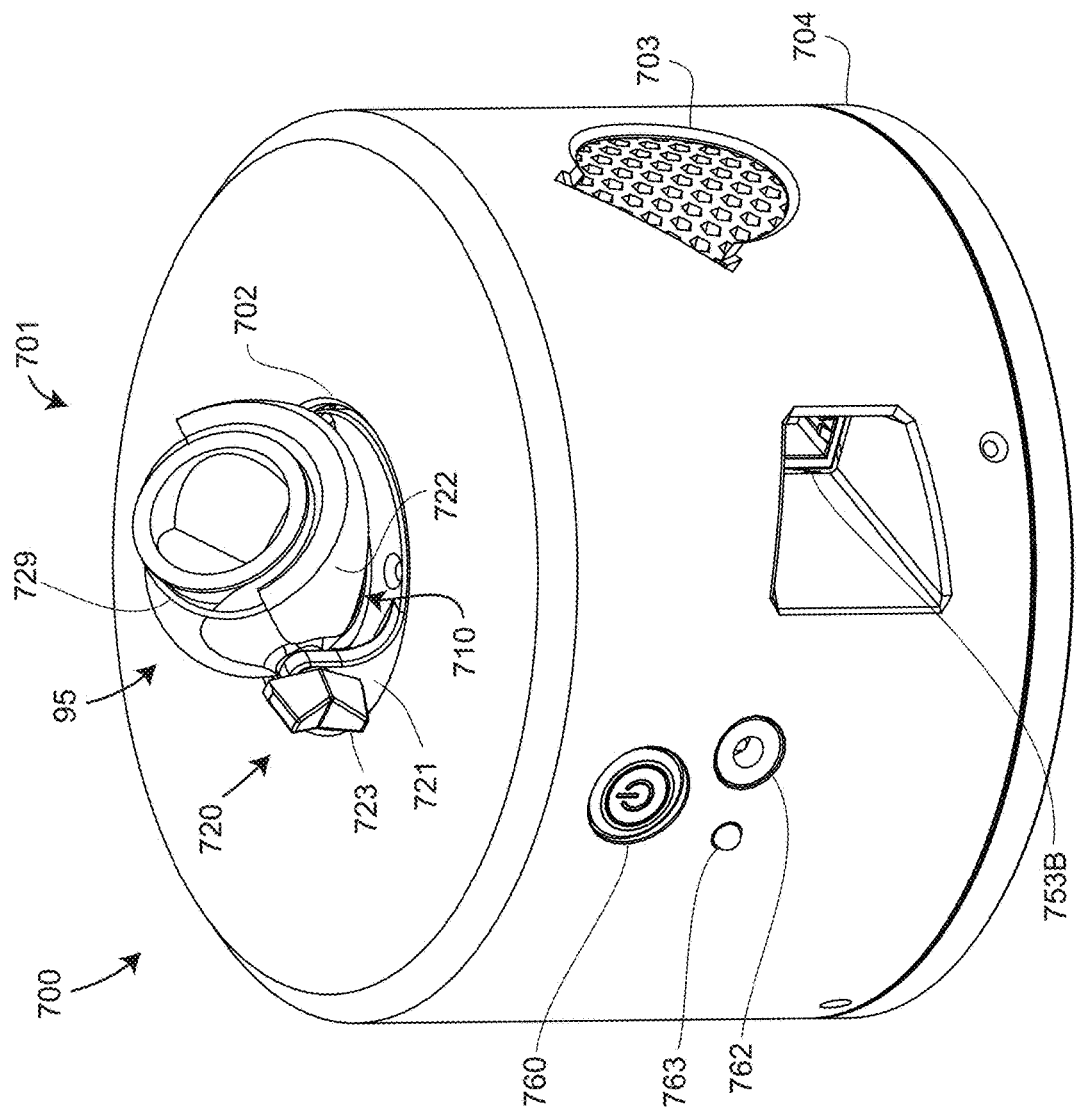
FIG. 7B
FIG. 7A

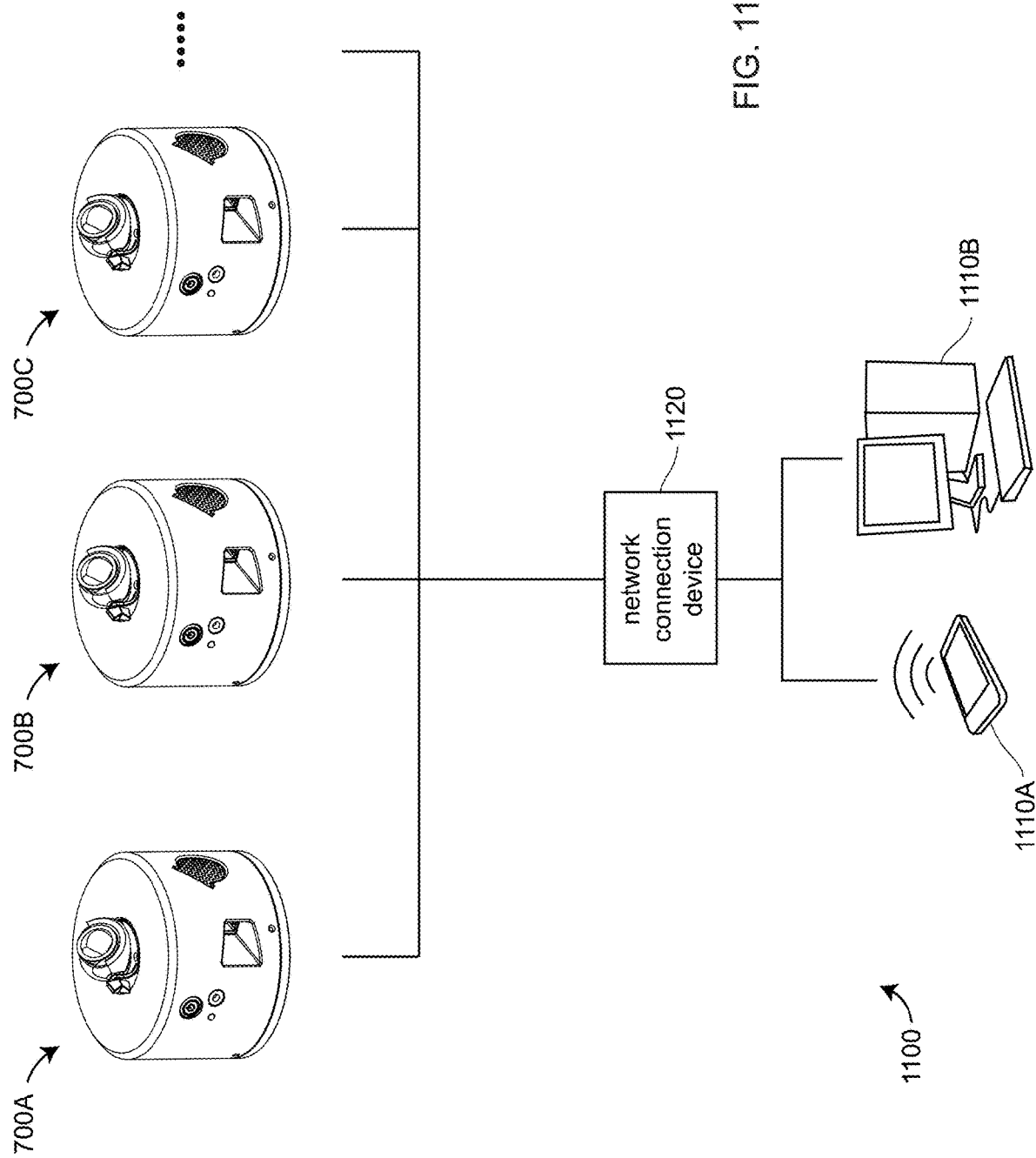

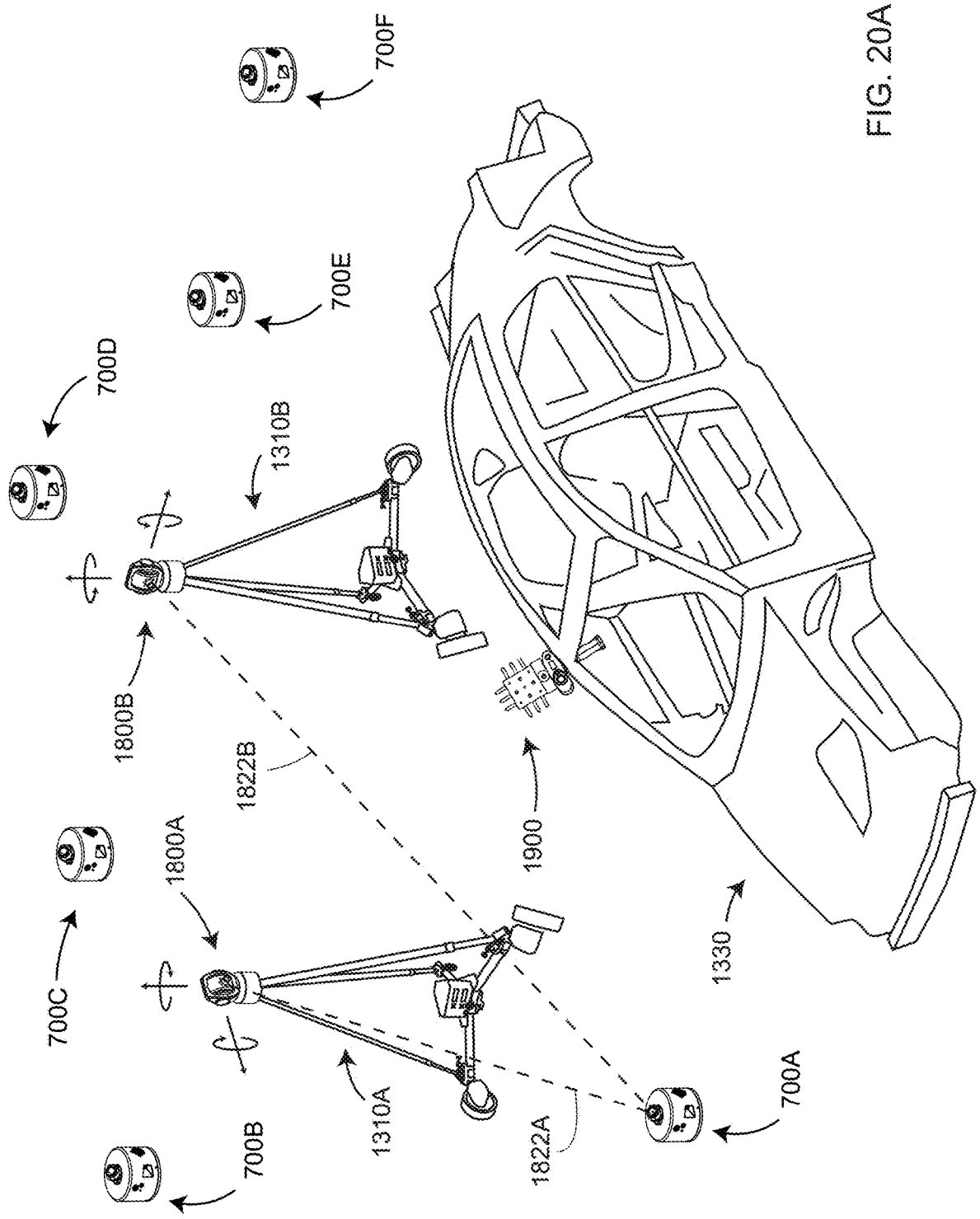

AUTOMATED ROTATION MECHANISM FOR SPHERICALLY MOUNTED RETROREFLECTOR

CROSS REFERENCE TO RELATED APPLICATIONS

This application claims the benefit of U.S. Provisional Application Ser. No. 62/629,246, filed Feb. 12, 2018, the entire disclosure of which is incorporated herein by reference.

BACKGROUND

The present disclosure relates to automation of three-dimensional (3D) coordinate measurements.

One set of coordinate measurement devices belongs to a class of instruments that measure the three-dimensional (3D) coordinates of a target point by sending a beam of light to the point. The beam of light may impinge directly on the point or on a retroreflector target in contact with the point. In either case, the instrument determines the coordinates of the target point by measuring a distance and two angles to the target. The distance is measured with a distance-measuring device such as an absolute distance meter or an interferometer. The angles are measured with an angle-measuring device such as an angular encoder. The beam may be steered with a gimbaled mechanism, a galvanometer mechanism, or other mechanism.

A tracker is a particular type of coordinate-measuring device that tracks the retroreflector target with one or more beams it emits, which may include light from a laser or non-laser light source. Coordinate-measuring devices closely related to the tracker include the total station. A total station is a 3D measuring device most often used in surveying applications. It may be used to measure the coordinates of a diffusely scattering target or a retroreflective target. Hereinafter, the term tracker (or laser tracker) is used in a broad sense to include trackers as well as total stations and to include dimensional measuring devices that emit laser or non-laser light.

In many cases, a tracker sends a beam of light to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface of the SMR rests remains constant, even as the SMR is rotated. Consequently, the tracker can measure the 3D coordinates of a surface by following the position of an SMR as it is moved over the surface. Stating this another way, the tracker measures only three degrees of freedom (one radial distance and two angles) to fully characterize the 3D coordinates of a surface.

One type of tracker contains only an interferometer (IFM) without an absolute distance meter (ADM). If an object blocks the path of the beam of light from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner. Some trackers contain only an ADM without an interferometer.

A gimbal mechanism within the tracker may be used to direct a beam of light from the tracker to the SMR. Part of the light retroreflected by the SMR enters the tracker and passes onto a position detector. A control system within the tracker uses position of the light on the position detector to adjust the rotation angles of the mechanical axes of the tracker to keep the beam of light centered on the SMR. In this way, the tracker is able to follow (track) a moving SMR.

Angle measuring devices such as angular encoders are attached to the mechanical axes of the tracker. The one distance measurement and two angle measurements of the tracker are sufficient to specify a three-dimensional location of the SMR. In addition, several trackers are available or have been proposed for measuring six degrees-of-freedom (six-DOF), rather than the ordinary three degrees-of-freedom. Such six-DOF measuring device may include tactile probes, triangulation scanners, sensors, and projectors, for example.

Many trackers today include one or more cameras. Such cameras may be attached to outer portions of the rotatable tracker frame or may be positioned internal to the tracker. The main uses for such cameras are in determining the location of retroreflectors or in performing six-DOF measurements.

In some cases, a tracker tracks the movement of an SMR and records 3D coordinates of an object when the SMR is brought in contact with the surface of the object. In other cases, a tracker tracks the movement of a six-DOF device and measures 3D coordinates of an object with the six-DOF device. In these types of measurements it is frequently necessary to measure an object from multiple different directions. For example, it may be necessary to measure an auto body-in-white from the front, right side, rear, and back side. When the tracker is moved from location to location to obtain these different 3D measurements, a method is needed for bringing the 3D measurements obtained by the tracker in the different locations into a common frame of reference. A way of doing this in practice is to place at three or more SMRs on kinematic nests spaced around the object to be measured. At each location, the tracker measures the positions of the different SMRs. In each case, the SMR is pointed back at the tracker to allow the beam of light from the tracker to fall within the acceptance angle of the SMR. To do this, an operator walks to each SMR and rotates it to face the tracker. In the case of a fully automated measurement, for example, when a tracker is on a self-propelled mobile stand or the object being measured is on a conveyor belt, it may not be possible for the operator to manually turn each SMR.

Although trackers and other 3D measuring instruments are generally suitable for their intended purpose, the need for improvement remains, particularly in enabling automation of 3D measurements by the tracker or other 3D measuring device.

SUMMARY

According to an embodiment of the present invention, an apparatus comprises: a kinematic nest operable to support a first element, the first element having a spherical surface; a rotation mechanism operable to rotate the first element on the kinematic nest while the spherical surface retains contact with the kinematic nest; and a first processor operable to activate the rotation mechanism.

According to another embodiment of the present invention, a method comprises: providing a system processor; providing a collection of at least three devices, each device having its own kinematic nest, rotation mechanism, and device processor, each device coupled to a first element having a spherical surface, the rotation mechanism operable to rotate the first element on the kinematic nest while holding the spherical surface in contact with a kinematic nest; and sending a signal from the system processor to the device processor in one of the devices and, in response, rotating the first element with the rotation mechanism.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIGS. 4A, 4B are front and section views, respectively, of the payload assembly according to an embodiment of the present invention;

FIG. 7A shows an isometric view of an SMR rotator according to an embodiment of the present invention;

FIG. 7B shows a kinematic mount for an SMR according to an embodiment of the present invention;

FIG. 11 shows a schematic representation of communication and control among processing elements and SMR rotators according to an embodiment of the present invention;

FIGS. 20A, 20B are isometric views illustrating a method for using two rotating cameras in conjunction with SMR rotators and a handheld measuring device to obtain registered 3D data over a portion of an object according to an embodiment of the present invention.

The detailed description explains embodiments of the invention, together with advantages and features, by way of example with reference to the drawings.

DETAILED DESCRIPTION

Figure 1:
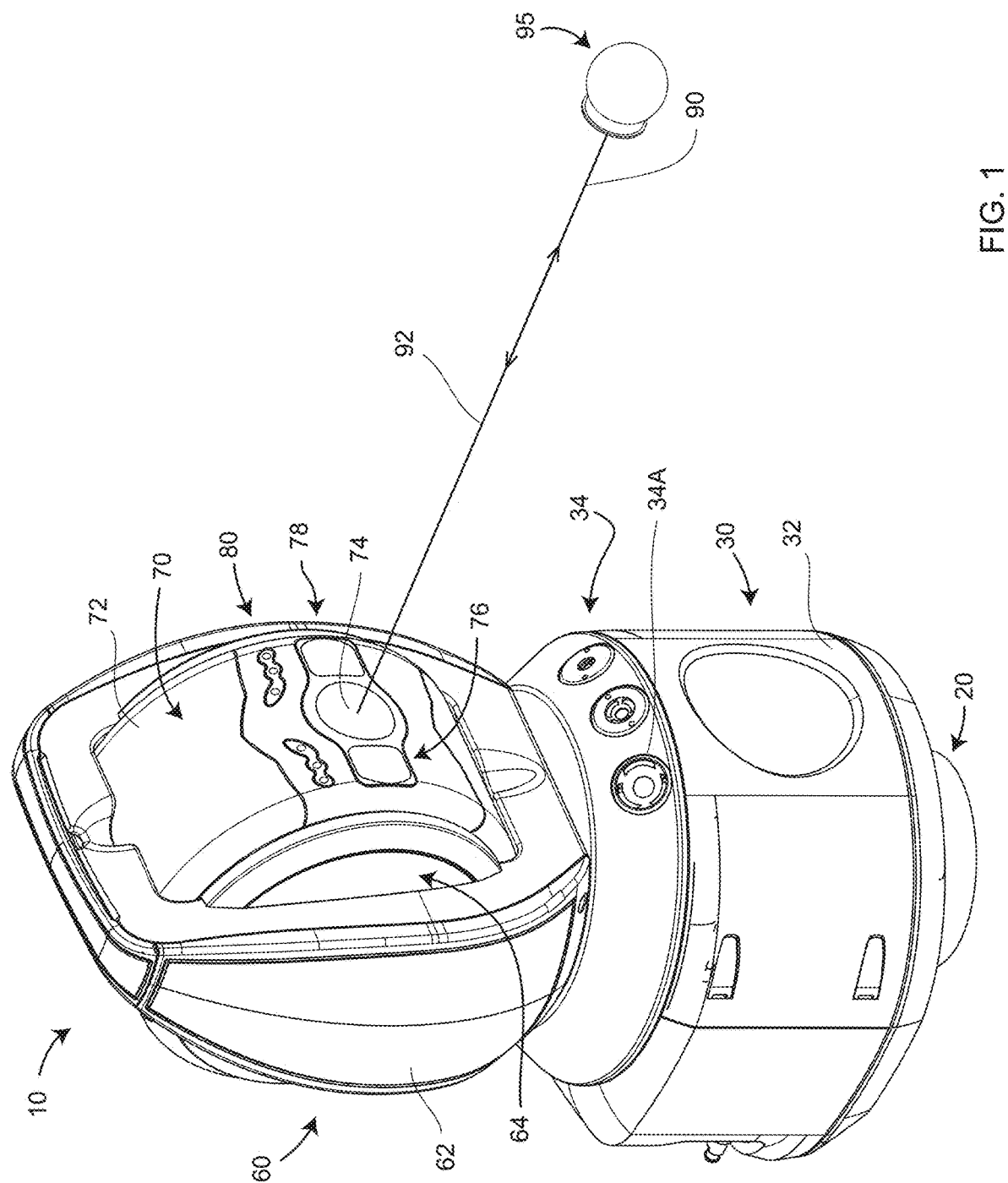
FIG. 1 is an isometric view of a tracker and a retroreflector in accordance with an embodiment of the present invention.

An exemplary tracker 10 is shown in FIG. 1. As explained in the introduction, the term tracker is here in a general sense that includes total stations. The beam of light 90 may come from a laser, a superluminescent diode, a light emitting diode (LED), or other type of collimated light source.

The exemplary tracker 10 in FIG. 1 sends outgoing light 90 through an exit aperture 74 to a retroreflector 95, which returns the light along a parallel path as returning light 92, which passes a second time through the exit aperture 74. The tracker includes a base assembly 30, a yoke assembly 60, and a payload assembly 70. An outer portion of the payload assembly 70 includes payload assembly covers 72, a first target camera 76, a second target camera 78, and payload indicator lights 80. The target cameras are also referred to as locator cameras. In an embodiment, the indicator lights 80 may emit a predetermined first color, such as green for example, to indicate found target, a second predetermined color, such as red for example, to indicate measuring, and other predetermined colors, such as blue or yellow for example, for user-definable or six-DOF indications. In an embodiment, an outer portion of the yoke assembly 60 includes yoke-assembly covers 62 and yoke indicator lights 64. In an embodiment, yoke indicator lights may advantageously be seen at large distances from the tracker. An outer portion of the base assembly 30 includes base-assembly covers 32 and magnetic home-position nests 34 operable to hold SMRs of different diameters. In an embodiment, three magnetic home-position nests 34 accept SMRs having diameters of 1.5 inches, 0.875 inch, and 0.5 inch. The 1.5-inch home-position nest is labeled 34A. A mandrel 20 may optionally be attached to a lower portion of the tracker 10.

Figure 2:
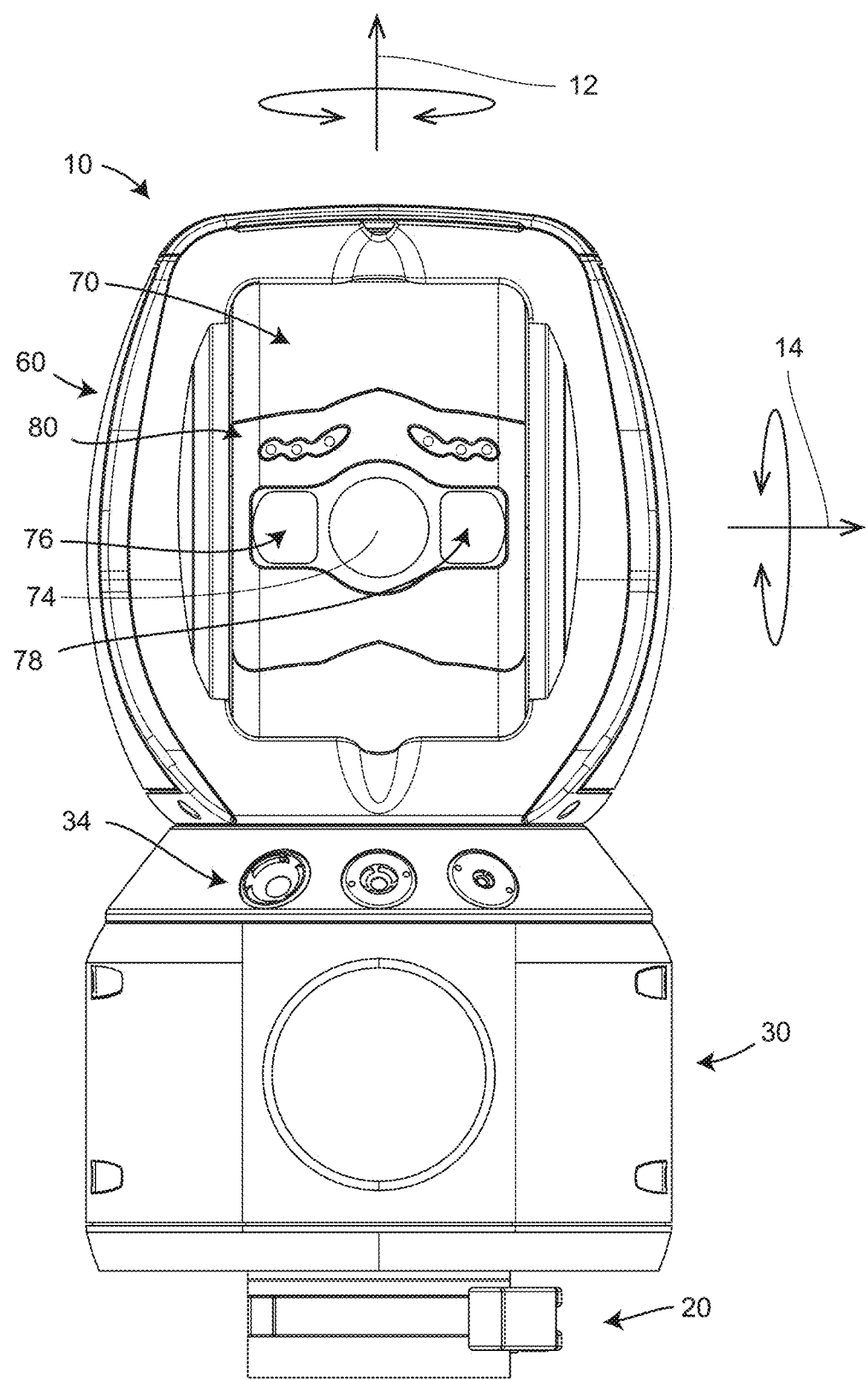
FIG. 2 is a front view of a tracker according to an embodiment of the present invention.

FIG. 2 shows a front view of the tracker 10. The base assembly 30 is ordinarily stationary with respect to a work area, for example, being mounted on an instrument stand or an industrial tripod. The yoke assembly 60 rotates about an azimuth axis 12, sometimes referred to as a standing axis or a vertical axis, although it should be appreciated that the tracker 10 may, in general, be positioned upside down or be rotated to an arbitrary angle with respect to a floor. The payload assembly 70 rotates about a zenith axis 14, sometimes referred to as a transit axis or a horizontal axis.

Figure 3:
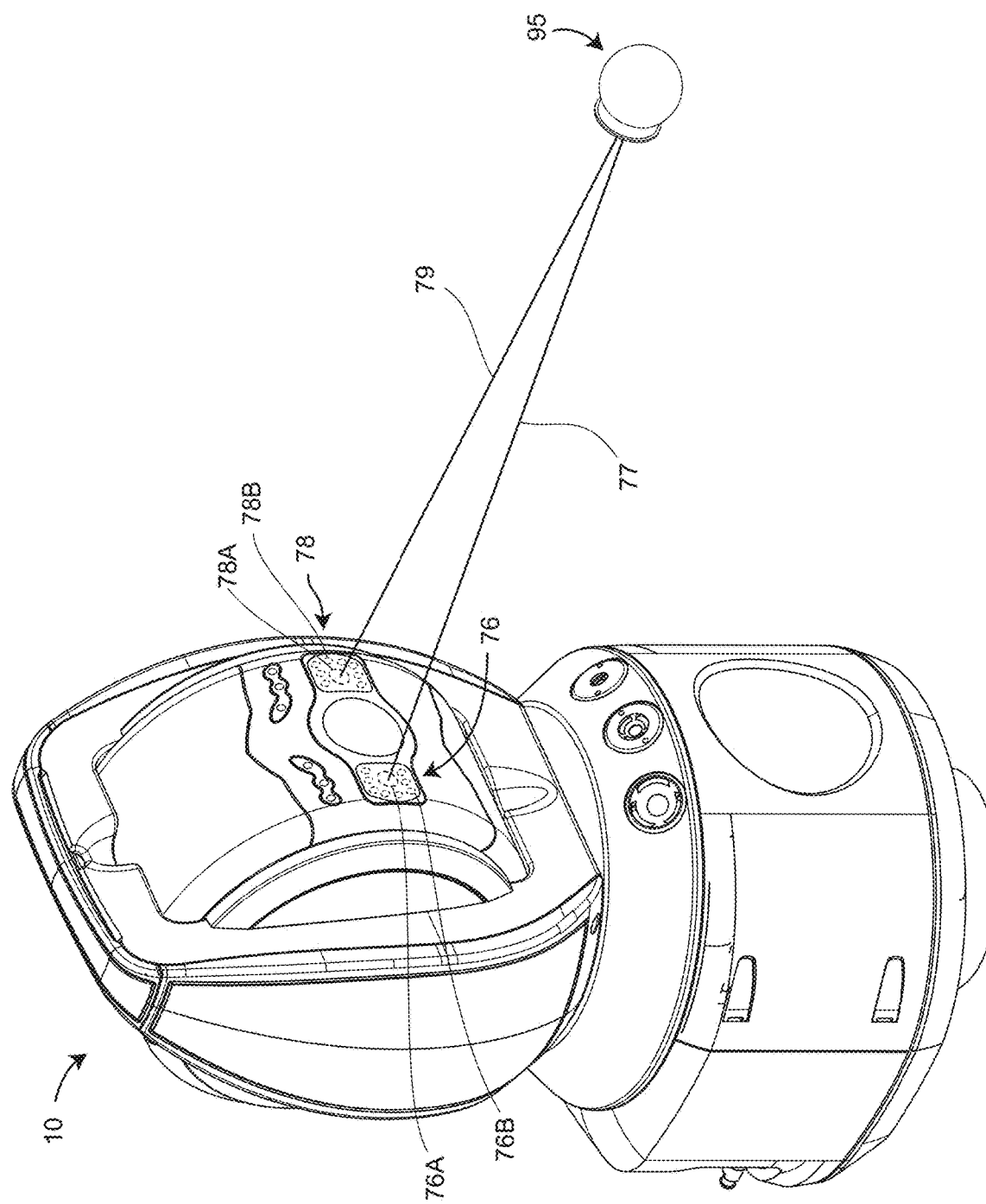
FIG. 3 is an isometric view of a tracker having an SMR illuminated by lights surrounding cameras according to an embodiment of the present invention.

In an embodiment illustrated in FIG. 3, one or more target cameras 76, 78 are used to locate one or more retroreflectors 95 in an environment. A stereo pair of target cameras, such as cameras 76, 78, is described in U.S. Pat. No. 8,670,114, the contents of which are incorporated by reference herein. In an embodiment, the light sources 76B, 78B, located close to the camera photosensitive arrays 76A, 78A, are periodically flashed at regular intervals. The flashing lights 76B, 78B illuminate the retroreflector 95. Reflected beams of light 77, 79 travel to the photosensitive arrays 76A, 78A, respectively. In an embodiment, the image capture rate of the photosensitive arrays 76A, 78A is set to half the flash rate of the lights 76B, 78B so that the retroreflector 95 appears to be brightly and dimly illuminated in alternate images. In an embodiment, the dimly illuminated retroreflector images are subtracted from the brightly illuminated retroreflector images, thereby obtaining bright a bright image spot for each illuminated retroreflector. However, the light from the light sources 76B, 78B is not reflected in a concentrated manner from non-retroreflective objects. Consequently, background images when subtracted appear to be relatively dim compared to the retroreflectors. This use of flashing lights 76B, 78B greatly simplifies the identification of retroreflectors in the environment.

In an embodiment, the light sources 76B, 78B are light emitting diodes (LEDs) that emit light at a near infrared wavelength such as 850 nm. In an embodiment, the beam of light 92 shown in FIG. 1 includes a different wavelength such as 635 nm, which corresponds to red light. In an embodiment, it is desirable for the cameras 76, 78 to accept visible wavelengths as well as the wavelengths emitted by the light sources 76B, 78B as this provides color images that further show bright flashing spots of light at the locations of retroreflectors such as the retroreflector 95. The target cameras 76, 78 may also be used without turning on the lights 76B, 78B. In this mode of operation, color images may be obtained without retroreflectors 95 producing bright spots in captured 2D images.

FIG. 4A is a front view of the payload assembly 70 and an upper portion of the yoke assembly 60. FIG. 4B is a cross-sectional view D-D (as shown in FIG. 4A) showing optical elements within the payload assembly 70. Optical elements placed mainly along a central portion of the payload assembly 70 are referred to as a central-optics assembly 400, which includes a launch/collimator assembly 410 and a position-detector assembly 460. Outside the central-optics assembly 410 are an ADM module 465 and an internal camera 470.

The combiner assembly 450 is used to combine the launch/collimator assembly 410 with the position-detector assembly 460, and it is also used to combine different beams of light from the position detector splitter 454 and the beam splitter 456. The position-detector assembly 460 includes a position detector mounted on a position-detector circuit board. The position detector is a detector that converts light into electrical signals and further provides secondary electrical signals that enable determination of a position at which light strikes a surface area of the position detector 478. Examples of position detectors include a lateral effect detector, a quadrant detector, a complementary metal-oxide-semiconductor (CMOS) array, and a charge-coupled detector (CCD).

The position-detector assembly 460 is ordinarily used to keep the outgoing beam of light 90 centered or nearly centered on a moving retroreflector 95, thereby causing the returning beam of light 92 to follow the same path as the outgoing beam of light 90. A control system (also referred to as a tracking system) causes the tracker motors to steer the beam to keep moving the beam toward the center of the position detector, thereby enabling tracking of the retroreflector 95 with the tracker 10. In practice, when the outgoing beam is exactly centered on a retroreflector, the returning beam may fall a little off a center of the position detector. The position on the position detector of the return beam when the outgoing beam is centered on the retroreflector is referred to as the retrace point of the position detector.

In an embodiment, the tracker 10 includes an internal camera 470 that provides a high resolution color image over a relatively narrow FOV. In an embodiment, the beam splitter 456 is coated to reflect a color image into the internal camera 470.

Figure 5:
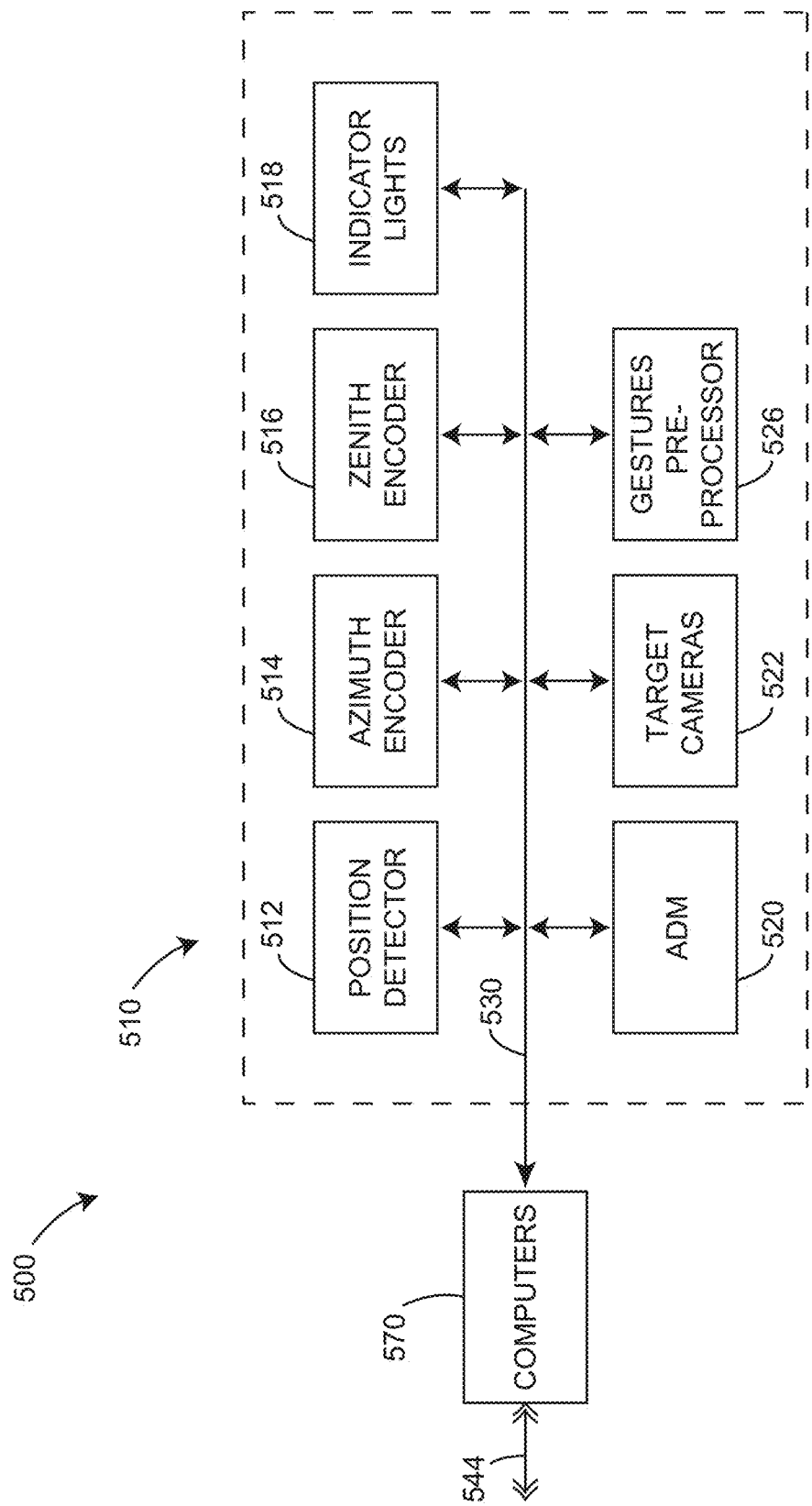
FIG. 5 shows electrical and computing elements coupled to a tracker according to an embodiment of the present invention.

FIG. 5 shows a computing system 500 coupled to the tracker 10, either as computing components within the tracker or as external computing components coupled to the tracker computing system, possibly by a networking link such as a link 544. The term computing system as used herein is taken as having the same meaning as processing system or simply processor. The term processor as used herein is taken to include all components used to support computing. Memory elements such as registers, cache, volatile memory, non-volatile memory, and remote storage are included as a part of the processor. Devices such as central processing units (CPUs), field-programmable gate arrays (FPGAs), digital signal processors (DSPs), and all support electronics that connect together computing and memory components are also included. Input/output devices through which the computing and memory elements receive information, possibly from a user, are also included as a part of the processor. Some typical computing functions 510 found in a laser tracker 10 are shown in FIG. 5. In an embodiment, these include position detector processing 512, azimuth encoder processing 514, zenith encoder processing 516, indicator lights processing 518, absolute distance meter (ADM) processing 520, target camera processing 522, and gestures pre-processing 526. This is only a partial list of processing functions included within the tracker. The processing elements within the tracker are connected to one another and to external computers 570 through a bus 530. Communication with external computers, including networked computers, may be carried out through wired or wireless communication channels.

The optical axis of the tracker is the axis through which the beam of light 92 leaves the tracker and returns to the tracker. The position of the retroreflector in the first images indicates the direction the position of the retroreflector 95 in space in relation to the tracker. Positions on the photosensitive arrays 76A, 78A of the target cameras 74, 76 are indicative of angles of objects in relation to a perspective center of the camera lens systems. Hence the positions of a retroreflector 95 on first images of the cameras 76, 78 may be used to determine the angles to points on an object of interest in relation to the cameras 76, 78.

Figure 12A:
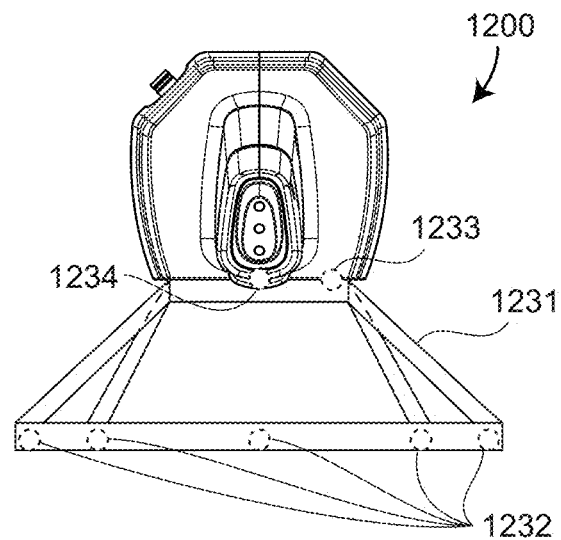
FIGS. 12A, 12B show top and front views, respectively, of a six-DOF tactile probe according to an embodiment of the present invention.
Figure 12B:
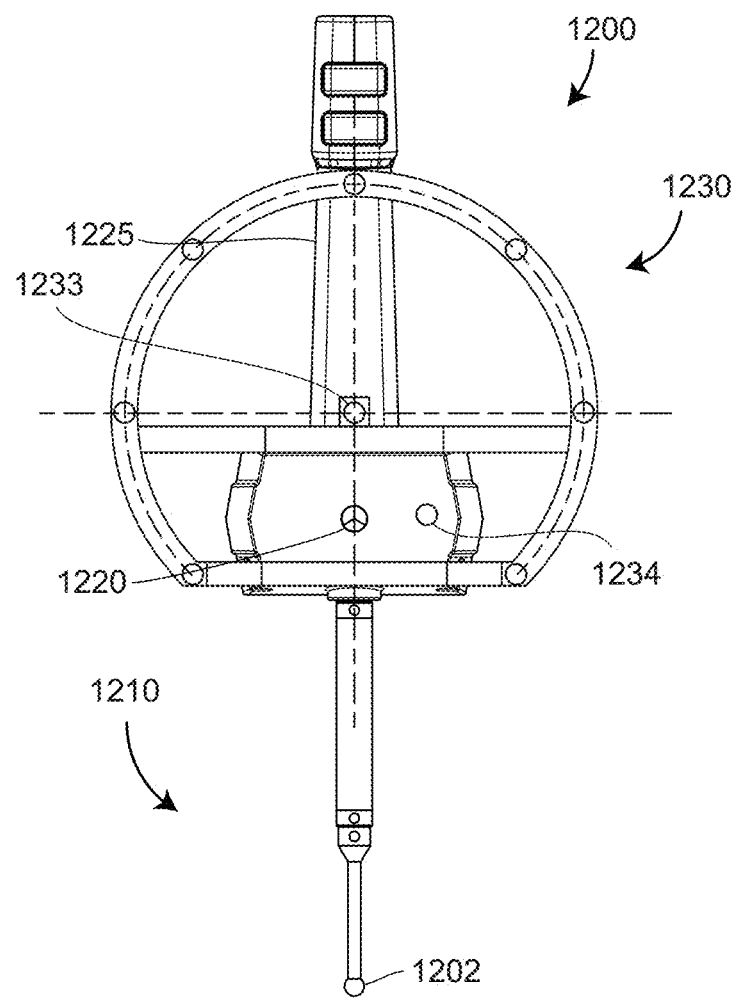
Figure 12C:
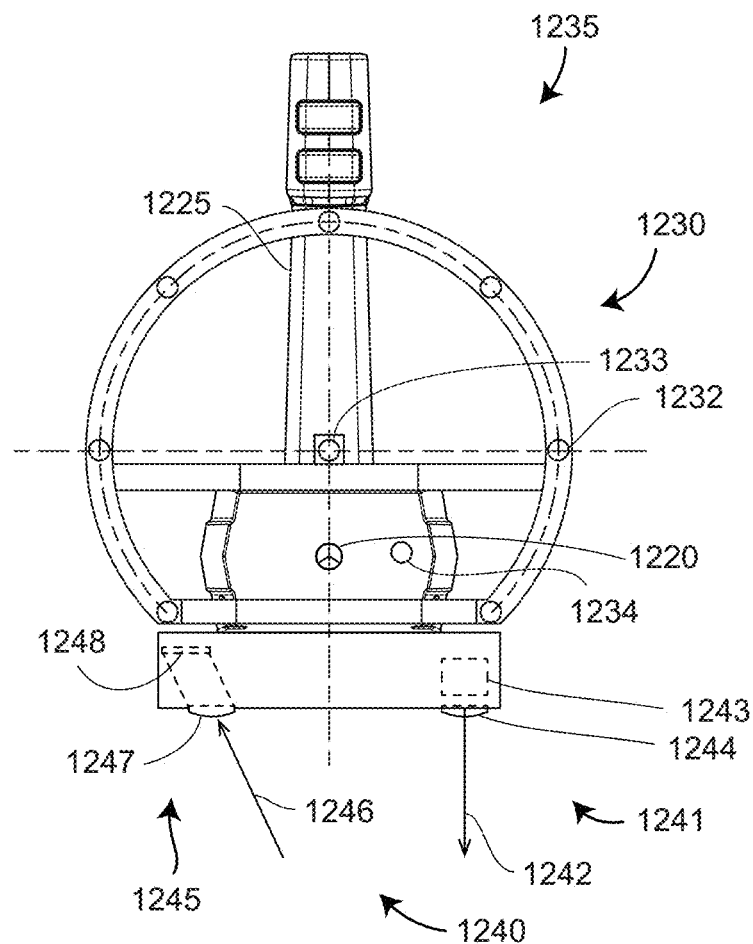
FIGS. 12C, 12D, 12E show front, bottom, and side views, respectively, of a six-DOF line scanner according to an embodiment of the present invention.

A common situation is for an object to be measured by a tracker placed at multiple different locations relative to an object to be measured. It may be that the object is stationary while the tracker is moved to the multiple different objects, or it may be that the tracker is held fixed in location, while the object is moved to multiple different locations. Regardless, the changing the relative pose of the tracker and the object allows the tracker to make 3D measurements on multiple portions of an object or on multiple sides of an object. As further described herein, the object is taken as stationary while the tracker is taken as moving. However, in an embodiment the reverse may also be true—for example, when an object is moving on a conveyor while the tracker is held still. This embodiment is illustrated in FIGS. 12A, 12B, 12C and discussed herein. To simplify the discussion herein, the tracker is generally illustrated and described as moving to different locations while the object is held fixed. However, it should be understood that the relative motion may likewise result from movement of the object.

Figure 6:
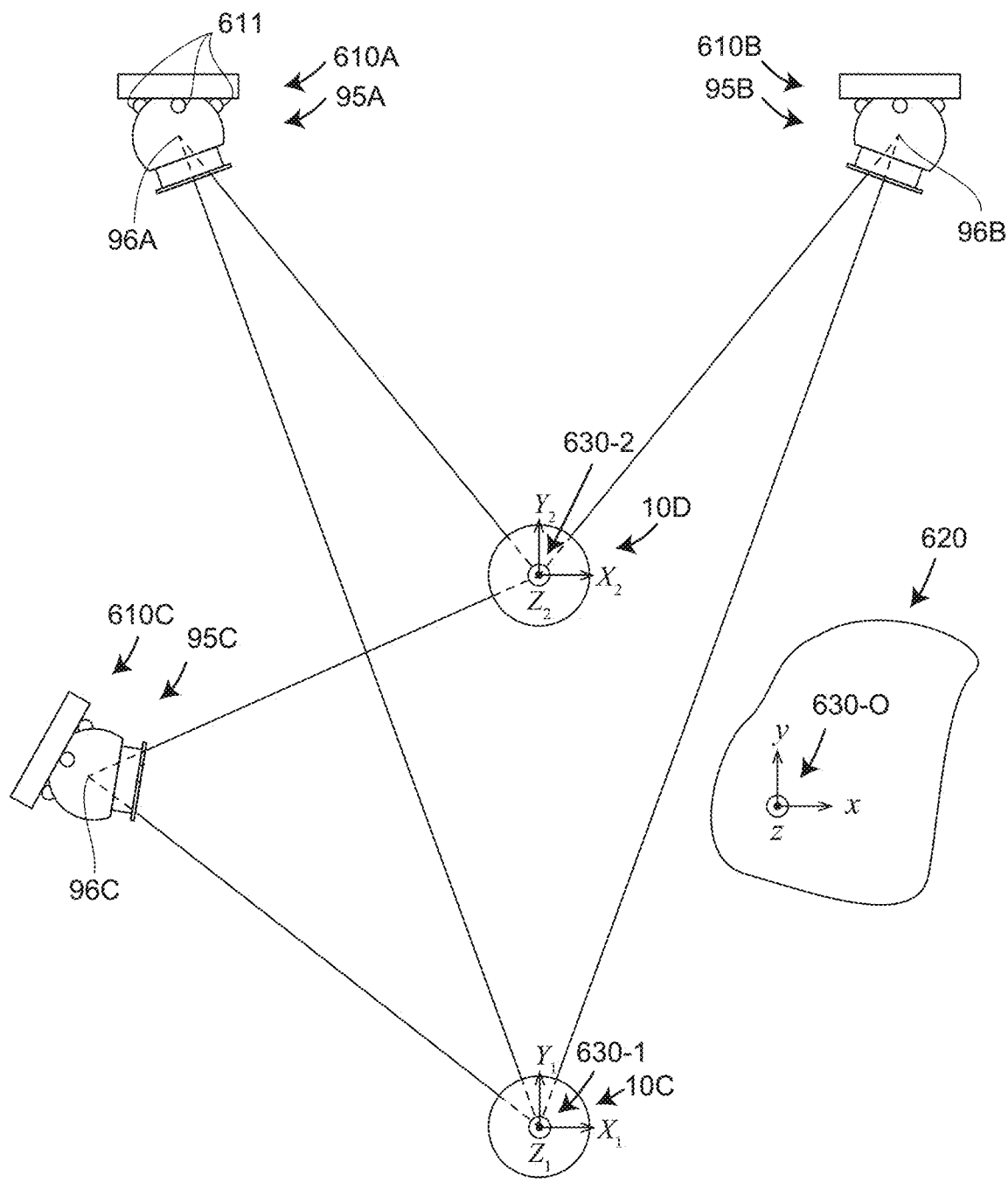
FIG. 6 is a schematic representation of a tracker measuring three retroreflectors and an object, the tracker at two locations relative to the object, according to an embodiment of the present invention.

FIG. 6 illustrates an arrangement that enables 3D measurements made by a tracker in multiple locations relative to an object frame of reference. The object frame of reference as here defined is a frame of reference fixed with respect to the object. In an embodiment illustrated in FIG. 6, a tracker 10 in a first location C is denoted as tracker 10C. The same tracker 10 at a different location D is denoted as tracker 10D. The tracker 10 at location C and at location D measure 3D coordinates of different sides of the object 620. In an embodiment, the tracker 10 at either location C or location D has an internal tracker frame of reference with tracker axes $X_T$, $Y_T$, $Z_T$ tied to the geometry of the tracker 10. In an embodiment, the internal tracker frame of reference has an origin at 3D coordinates (0, 0, 0) at the tracker gimbal point, which is the ideal center of mechanical rotation of the tracker. In an embodiment, the $X_T$ axis is pointed forward (toward the SMR 95 in FIG. 1), the $Y_T$ axis is pointed to the tracker's left (to the right in FIG. 2), and the $Z_T$ axis is pointed upward (along the direction 12 in FIG. 2). The corresponding tracker 10 at location D has the same axes $X_T$, $Y_T$, $Z_T$ in its internal tracker frame of reference.

The 3D measurements obtained by the tracker 10 at the location C and the 3D measurements obtained by the tracker 10 at the location D are transformed into an object frame of reference 630-O, which has three mutually perpendicular coordinate axes x, y, z. The tracker at the location C has a first frame of reference 630-1 with axes $X_1$, $Y_1$, $Z_1$. In general, each of the axes $X_1$, $Y_1$, $Z_1$ are translated and rotated relative to the axes x, y, z of the object frame of reference. The tracker at the location D has a second frame of reference 630-2 with axes $X_2$, $Y_2$, $Z_2$. In general, each of the axes $X_2$, $Y_2$, $Z_2$ are translated and rotated relative to the axes x, y, z of the object frame of reference.

To consistently combine 3D coordinates measured by the tracker at the location C with the 3D coordinates of the tracker at the location D, a method is used to transform the 3D coordinates of the object 620 measured by the tracker 10 in the first frame of reference 630-1 at the location C and by the tracker 10 in the second frame of reference 630-2 at the location D into 3D coordinates in the object frame of reference 630-O. Such a transformation may be made by performing a mathematical transformation procedure. Many types of mathematical transformation procedures are equivalent and may be used. In an embodiment, a rotation matrix and a translation matrix are applied in turn to each of the measured 3D coordinates. In an embodiment, this mathematical transformation procedure is applied to the 3D coordinates measured at locations C and D, with the values of the rotation matrix and the translation matrix differing for the locations C and D. The result is to place all the 3D coordinates measured at locations C and D into the single object frame of reference 630-O.

A way to collect the information needed to transform 3D coordinates from the tracker frame of reference to the global frame of reference is now described. The retroreflectors 95A, 95B, 95C are all fixed in the object frame of reference 630-O, which means that they are fixed with respect to the object 620. The retroreflectors 95A, 95B, 95C have central reflection points 96A, 96B, 96C, also referred to herein as the first point, the second point, and the third point, respectively. For the case of an SMR that contains a cube-corner retroreflector, the central reflection point is at the vertex of the cube-corner, which is located at the center of the SMR sphere.

In an embodiment, the tracker 10 at location C measures the central reflection points 96A, 96B, and 96C, and the tracker 10 at location D also measures the central reflection points 96A, 96B, 96C. These measured points are used to transform the measured 3D coordinates at the locations C and D into the object frame of reference 630-O. In a simple exemplary case, the first frame of reference 630-1 of the tracker at location C is also taken as the object frame of reference 630-O. Since the second frame of reference 630-2 is different than the first frame of reference 630-1, the second frame of reference 630-2 may not in this instance coincide with the object frame of reference 630-O. Other tracker measurements, for example, of features on the object 620 from the tracker at location C or D, could be used to determine transformations fixing the global frame of reference to some features of the object. However, in the illustrated embodiment, the three measurements of the central reflection points 96A, 96B, 96C from the tracker 10 at locations C and D provide the information to place 3D coordinates of points measured on the object 620 into the object frame of reference 630-O.

In an embodiment, the reflection points 96A, 96B, 96C are the vertexes of cube-corner retroreflectors centered in SMRs. In an embodiment, the SMRs 95A, 95B, 95C are placed on kinematic nests 610A, 610B, 610C. In an embodiment, each kinematic nest includes three spherical contact points 611 in contact with the spherical surface of the SMRs 95A, 95B, 95C. Other types of kinematic mounts are possible, and kinematic nests 610A, 610B, 610C are not limited to having spherical contact points. In an embodiment, a kinematic nest includes a magnet that securely holds a ferromagnetic SMR in place. Note that the SMRs 95A, 95B, 95C may be rotated on the kinematic nests 610A, 610B, 610C, respectively, without changing the location of the sphere center or vertex. This property of the kinematic nests when used with the SMR enables the SMRs to retain constant 3D coordinate values for the reflection points 96A, 96B, 96C as the SMRs is pointed to a beam of light from each tracker 10 at locations C and D or other locations in space.

It should be noted that other types of retroreflectors besides cube-corner retroreflectors or SMRs may be used. For example, one or more of the retroreflectors may be cateye retroreflectors. Such cateye retroreflectors may be made in a variety of ways. In one embodiment, the cateye retroreflector is made of two hemispherical glass elements joined at their flat surfaces and arranged so as to focus the light to a point at a rear surface of one of the two hemispheres. Such cateye retroreflectors may have an acceptance angle of +/−60 degrees, which is approximately twice the acceptance angle of a typical SMR. In embodiments of the present invention, a variety of retroreflector types may be used.

The description given above is for a single tracker 10 moved to two different locations C and D to measure 3D coordinates of an object 620 from different directions before combining the measured 3D coordinates into a common object frame of reference. Although this is a common approach in practice, it is also possible to mount two different trackers at the locations C and D and to measure 3D coordinates of points on the object 620 with both trackers.

In practice, when moving a tracker to a multiplicity of different locations such as the locations C and D in FIG. 6, it is often necessary to rotate the SMRs 95A, 95B, 95C to place the angle of acceptance along a line that connects the SMR to the tracker. In an open-air cube-corner retroreflector, the angle of acceptance is approximately +/−25 degrees. Consequently, it is often the case that the SMRs such as the SMRs 95A, 95B, 95C have to be rotated several times during completion of a measurement tasks such as measuring all four sides of an object. For measurements performed manually by an operator, it would be convenient to have the SMRs automatically rotate to face the tracker whenever the tracker was moved to a new location. For measurements performed automatically, for example, using a tracker mounted on a robotic mobile stand, automatic rotation of SMRs is desired. There are other embodiment in which the tracker is left in a single location but nests are mounted on a moveable object. An example of this situation is one in which a 3D measuring device is mounted on a cart and moved from place to place to measure 3D coordinates. A way to accurately register the 3D coordinates measured in each location is to measure with a tracker three or more SMRs placed on the cart at each location. By measuring the positions of the SMRs after each move, the tracker obtains enough information to enable registration of the multiple 3D data sets. In this case also, automatic rotation of SMRs is either convenient or essential, depending on the application.

FIG. 7A, FIG. 7B, FIG. 8, FIG. 9 and FIG. 10 show an embodiment of a SMR rotator 700 that automatically rotates SMRs 95 to face a laser tracker. In an embodiment, an SMR 95 is made to rotate on three points of a kinematic mount while the kinematic mount is held fixed in space. In an embodiment, the kinematic mount is the 1.5-inch magnetic home-position nest 34A shown in FIG. 1. In FIG. 7A, FIG. 7B, FIG. 9 and FIG. 10, this same nest is labeled 710. Elements of this nest are shown in FIG. 7B. In an embodiment, the nest has three kinematic contact points 712. These contact points serve the same function as the contact points provided by the spheres 611 in FIG. 6. The contact points 712 are configured such that the vertex 99 of the retroreflector 98 in the SMR 95, which is coincident with the center of the spherical surface 94, is at the same position within the magnetic nest 710. Hence, the vertex 99 and center 94 of the SMR 95 will have the same 3D coordinates before the SMR 95 is removed from the nest 710 and after it is placed back on the nest 710. As used herein, a nest having this property is referred to as a kinematic nest. In most embodiments, the change in 3D coordinates of the SMR before and after replacement will not differ by more than one micrometer for the nest 710. As shown in FIG. 7B, the kinematic nest 710 also includes cutouts 716 and attachment holes 717 placed in a nest surface 712.

Figure 8:
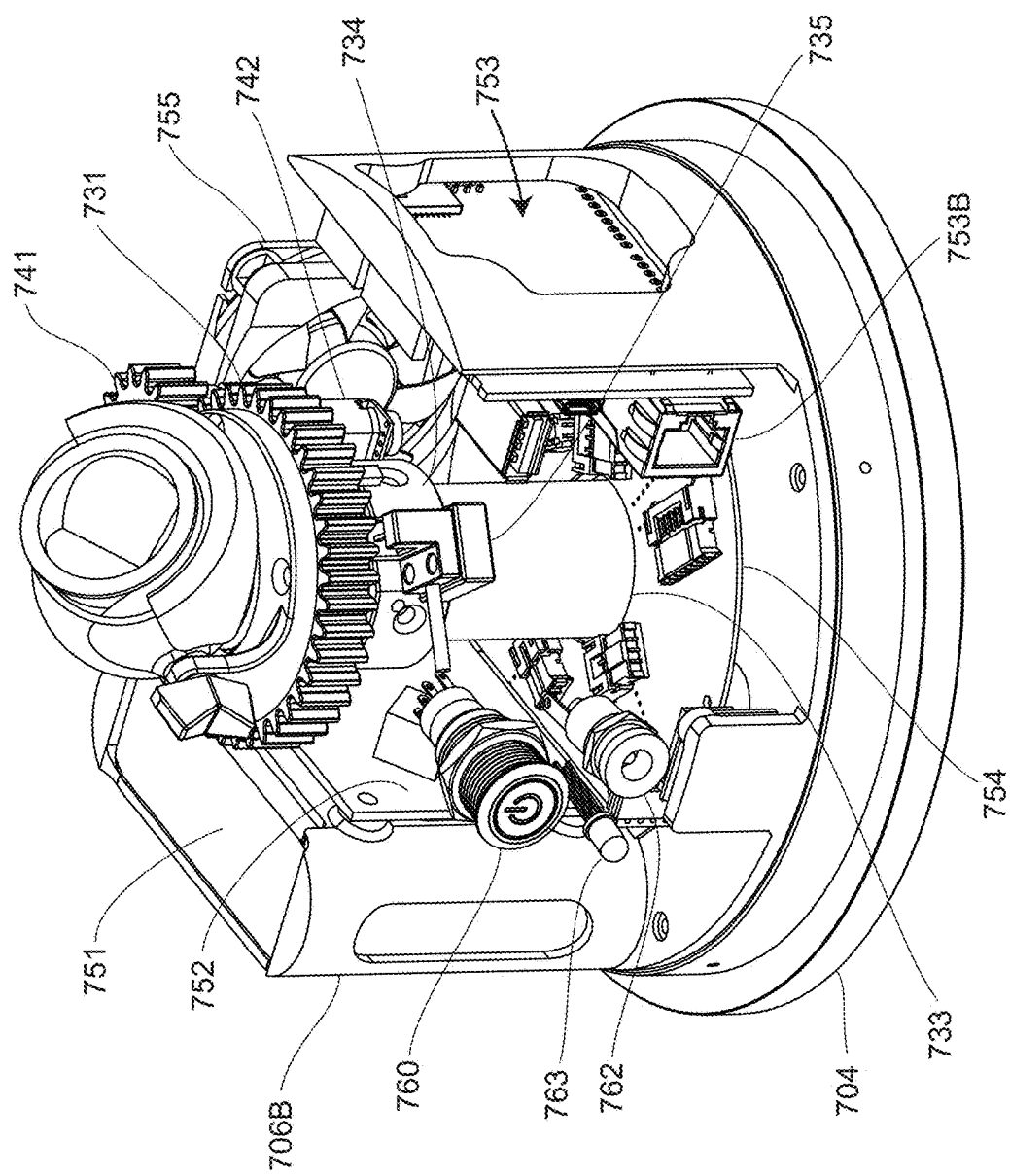
FIG. 8 shows an isometric partial view of the SMR rotator according to an embodiment of the present invention.
Figure 9:
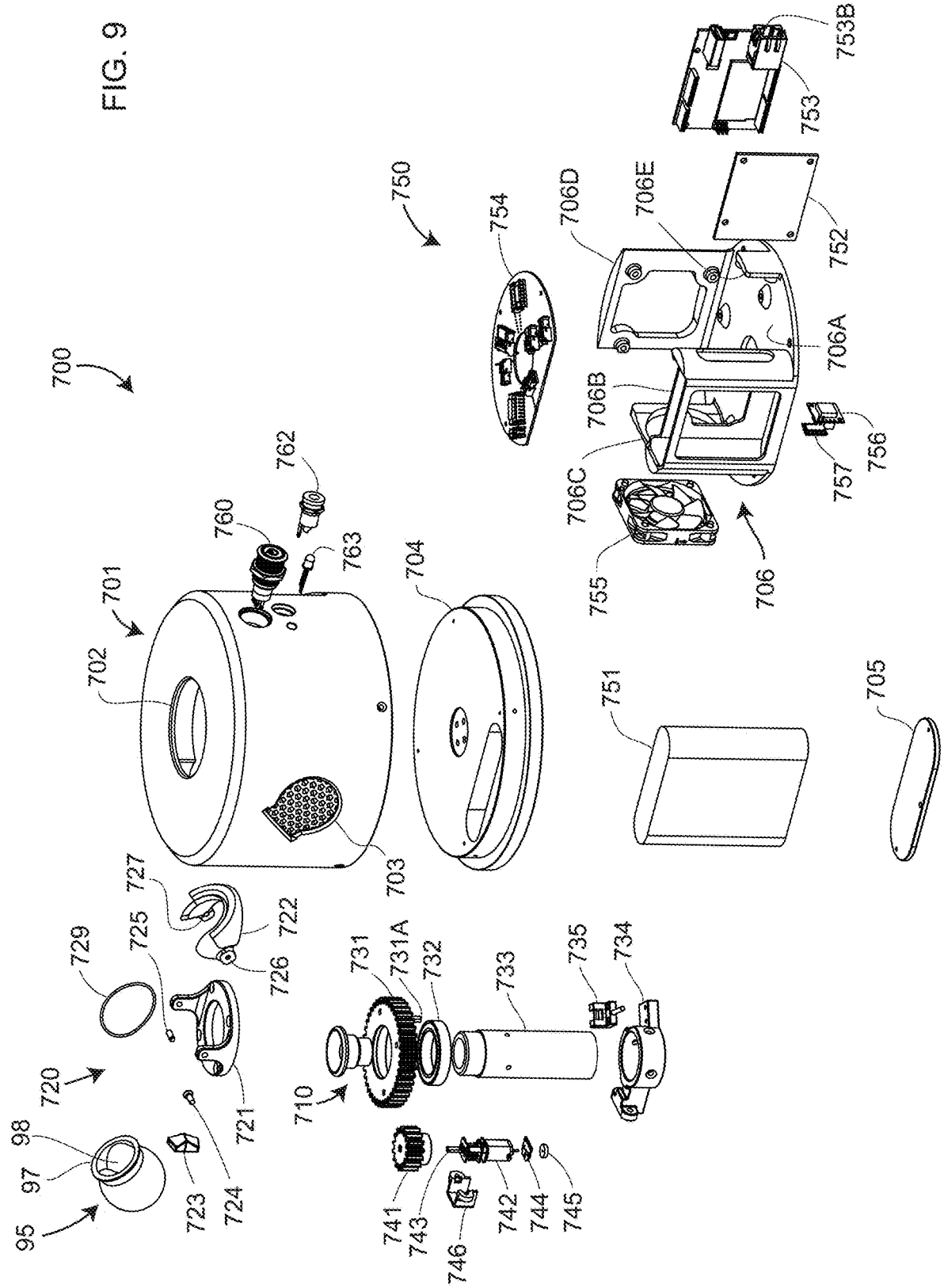
FIG. 9 shows a disassembled view of an SMR rotator according to an embodiment of the present invention.

The SMR 95 is held against the kinematic nest 710 by the magnet 714 with an SMR base 718. The SMR 95 and it is locked in its orientation by the collar attachment assembly 720 shown in FIG. 9. The collar attachment assembly 720 includes an attachment base 721, attachment bracket 722, wing nut 723, screw 724, dowel pin 725, and rubber band 729. The attachment bracket 722 is attached on one side of the attachment base 721 with the wing nut 723 and screw 725 through the hole 726. The attachment bracket 722 is attached on the other side of the attachment base 721 with the dowel pin 725. The attachment bracket 722 is adjusted to a desired position and then locked in place with the wing nut 723. As shown in FIGS. 7A, 8, 9, the rubber band 729 goes around the SMR collar 97 and a lip of the attachment bracket 722, thereby holding the SMR 95 secure against the attachment bracket 722. The SMR 95 rotates smoothly on the fixed kinematic nest 710.

As shown in FIG. 9, the nest 710 is glued or otherwise attached to an SMR stem 733. A bearing 732 is coupled on the inside of the bearing 732 to the SMR stem 733. The bearing 732 is coupled on the outside of the bearing 732 to the secondary gear 731. The bearing provides low friction to the secondary gear 731 in rotating about the SMR stem 733. In an embodiment, the attachment base 721 is screwed to the secondary gear.

The secondary gear 731 is driven by a primary gear 741, which is driven by a shaft 743 of a motor 742. In an embodiment, the motor 742 is a 1000:1 micro metal gear motor. Such a motor provides fine control at low speeds. In an embodiment, the motor 742 is attached to a rotary encoder that includes a magnet 745 and Hall effect sensor 744. The motor 742 is attached to a motor mount 734 with motor bracket 746. The motor mount 734 is attached to the SMR stem 733. The motor mount 734 also supports home sensor 735. In an embodiment, the home sensor 735 is a U-shaped micro photoelectric sensor. The photoelectric sensor emits a beam of light across the U-shaped region and provides an electrical indication when the beam is broken by a projection 731A of the secondary gear 731. The home sensor 735, in combination with the magnet 745 and Hall effect sensor 744, provides a convenient way to determine the rotational position of the SMR 95.

Figure 10:
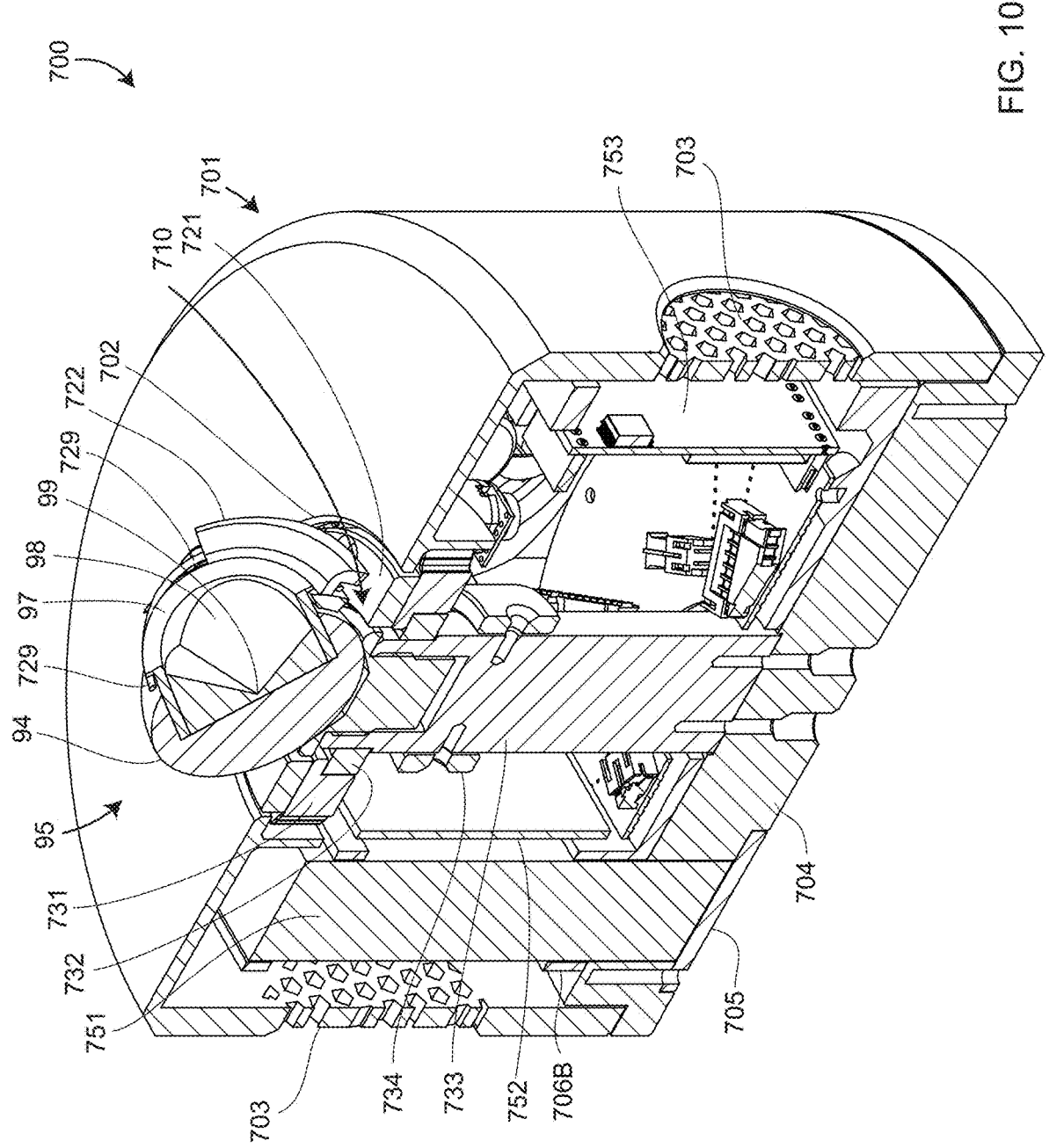
FIG. 10 shows a cross sectional view of an SMR rotator and SMR according to an embodiment of the present invention.

In an embodiment, a housing cover 701 is attached to a housing base 704. In an embodiment, a mounting cage 706 includes a cage base 706A, which is attached to the housing base 704. The SMR stem 733 is attached through a hole in the cage base 706A to the housing base 704. An interface board 754 is attached to the cage base 706A. The interface board 754 includes many wire sockets for interconnecting electrical components within the SMR rotator 700. In an embodiment, the mounting cage 706 includes a battery holder 706B that holds a battery 751. The battery is held in position by a battery cover 705. In an embodiment, the battery 751 is a rechargeable battery such as a lithium-ion battery. In an embodiment, the mounting cage 706 includes a fan mount 706C to support a fan 755. FIG. 10 shows that the housing cover 701 includes ventilation ports 703 to permit outside air to be circulated into and out of the interior of the housing cover 701. There are three ventilation ports, one of which is placed on the opposite side of power switch 760 and hidden from view in FIG. 10. The housing cover 701 further includes an upper cutout 702 through which elements are mounted for support of the SMR 95.

In an embodiment, SMR rotator 700 includes an electronics system 750 having electrical boards and components attached to the mounting cage. In an embodiment, the first electronics mount 706D attaches to a computing circuit board 753. In an embodiment, the computing circuit board is an Arduino Yun or Arduino Tian. In other embodiments, other types of computing circuit boards are used. In an embodiment, the mounting cage 706 further includes a second electronics mount 706E. In an embodiment, the second electronics mount 706E holds a voltage regulator 756 and a motor driver 757. In an embodiment, the voltage regulator 756 takes an input voltage of up to 7.5 volts from the power management circuit board 752 and efficiently reduces it to 5 volts. In an embodiment, the power management circuit board 752 receives input voltage (for charging the battery 751) from a separate platform power supply that receives input voltage from 100 to 240 VAC and outputs 19 VDC through the input ports 762. In an embodiment, the power management circuit board 752 attaches to the outside of the battery holder 706B. The housing cover 701 includes openings for a power switch 760, a DC jack 762, a multicolor status light emitting diode (LED) 763, and access to an Ethernet connector 753B.

In an embodiment illustrated in FIG. 11, a system 1100 includes three or more SMR rotators 700A, 700B, 700C that receive signals from a system processor. A system processor might be any or all of the processors in or connected to a laser tracker 10 as illustrated in FIG. 5. It might be a processor in a fixed computer 1110B or mobile device such as a handheld phone 1110A. The signal may be transmitted via wired or wireless mediums. In an embodiment, the signals to and from the SMR rotators 700A, 700B, 700C are routed through a network connection device 1120. For the case in which wireless signals are used, the network connection device 1120 may be a "Wi-Fi/Ethernet Access Point."

In an embodiment, a laser tracker 10 is used to measure 3D coordinates of a probe tip 1202 of a six-DOF probe 1200 as illustrated in FIGS. 12A, 12B. Many types of six-DOF probes are possible, and the six-DOF probe 1200 illustrated in FIGS. 12A, 12B is only one of many embodiments for which the present invention is applicable and the claims should not be so limited. In an embodiment, the probe tip 1202 is a part of a shaft 1210 that may be used to measure points hidden from the view of the tracker 10 as well as points not hidden from the view of the tracker 10. Examples of hidden points include points in holes or points on rear surfaces of an object. In an embodiment, the tracker 10 sends a beam of light to a retroreflector 1220. The light reflected from the retroreflector 1220 back into the tracker 10 is used to determine 3D coordinates of the retroreflector. In an embodiment, the tracker includes a structural frame 1225 that supports all elements of the six-DOF probe 1200, including the retroreflector and an LED assembly 1230. In an embodiment, the light-target assembly includes a support element 1231 on which are mounted light targets 1232 such as light-emitting diodes (LEDs) 1232. Additional light targets such as light targets 1233 and 1234 may be mounted on the structural frame 1225. A camera coupled to the tracker 10, for example, with the camera placed within the tracker, records an image of the light targets and, from the pattern of the recorded positions of the imaged light targets, determines orientation angles of the six-DOF probe 1200. Such orientation angles may be described in a variety of ways. One common way to describe such angles is as pitch, yaw, and roll angles. Having determined three translation degrees of freedom (for example, x, y, z) and three orientational degrees of freedom (for example, pitch angle, yaw angle, roll angle), a processor coupled to the tracker may determine the 3D coordinates of the probe tip 1202.

Figure 12D:
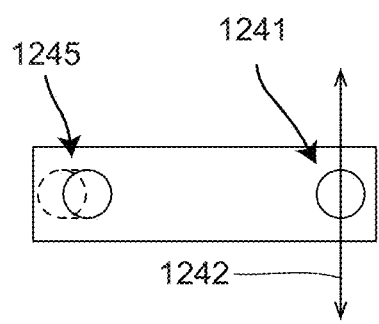
Figure 12E:
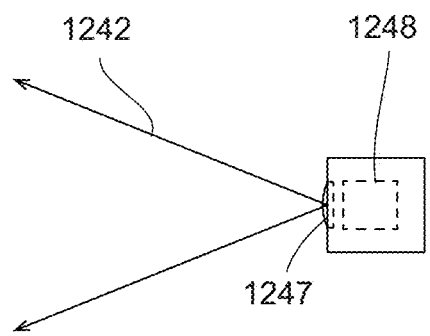

In an embodiment, a laser tracker 10 and non-contact six-DOF probe 1235 are used cooperatively to measure 3D coordinates of a projected line of light 1242 as illustrated in FIGS. 12C, 12D, 12E. Many types of non-contact six-DOF probes are possible, and the six-DOF probe 1235 illustrated in FIGS. 12C, 12D, 12E is only one of many embodiments for which the present invention is applicable. In an embodiment, a tracker 10 measures the 3D coordinates of the retroreflector 1220, while at the same time capturing with a camera coupled to the tracker an image of the illuminated points of light such as the points of light 1232, 1233, 1234. As explained in the preceding paragraph, this collected information is sufficient to enable the laser tracker 10 to determine the six degrees-of-freedom of the non-contact six-DOF probe 1235. In an embodiment, a line scanner 1240 coupled to the six-DOF probe 1240 determines 3D coordinates of points on an object that are intersected by a line of light 1242. In an embodiment, the line of light is projected in a plane approximately perpendicular to a line connecting a projector 1241 and a camera 1245. In an embodiment, the projector 1241 includes a light source 1243 and a lens 1244. The light source may be a laser, superluminescent diode, LED, or other device. In an embodiment, the camera images the beam of light 1242 on an object surface with the camera 1247. In an embodiment, light passes through a camera lens 1247, which images the light on a photosensitive array 1248. In an embodiment, a processor coupled to the tracker 10 evaluates the image of the captured 2D image of the stripe of light to determine the distances and angles to the object points illuminated by the line of light. In other embodiments, other types of illumination patterns may be used. For example, in another approach, light is projected in an area rather than a line, thereby enabling a collection of 3D coordinates to be determined for an area rather than a line.

Figure 12F:
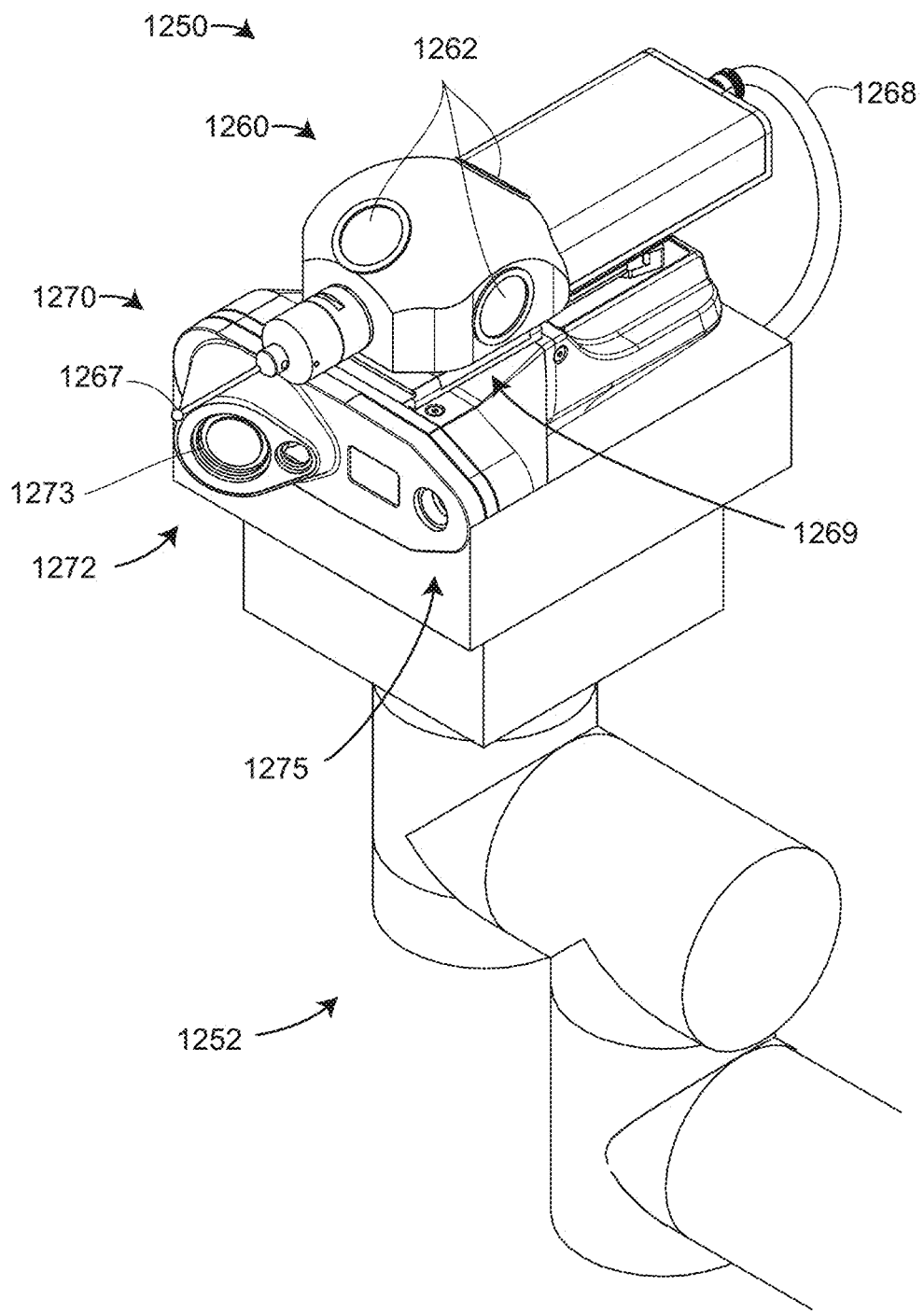
FIG. 12F shows a 3D measuring device attached to articulated elements of a robot according to an embodiment of the present invention.

In another embodiment, a six-DOF probe is not handheld by an operator but instead is mounted on a machine tool or robotic device. In an embodiment, a system 1250 includes a robotic mechanism 1252 operable to hold a six-DOF probe 1260. The robotic mechanism may include mechanical links may be adjusted in multiple degrees-of-freedom. In an embodiment illustrated in FIG. 12F, the six-DOF probe 1260 includes protective windows 1262 placed over retroreflectors having the lines marked on the retroreflectors. In an embodiment, the lines include intersection lines between reflecting mirror elements darkened so as to be visible to a camera coupled to the laser tacker 10. By recording the 3D coordinates of the retroreflectors and by analyzing the orientations of the pattern of lines, the six degrees-of-freedom of the six-DOF probe 1260 may be determined. Such six-DOF values may then be used to determine 3D coordinates of a probe tip 1267. In an embodiment, the system further includes a line scanner 1272 of the sort sometimes used on articulated arm CMMs. In an embodiment, the line scanner 1272 includes a line projector 1275 and a two-dimensional (2D) camera 1272, which includes a lines 1273. Used together, the six-DOF probe 1260 and the line scanner 1270 may be used to determine 3D coordinates of points intersected by the projected line of light within a frame of reference of the tracker 10, even as the robotic end effector is moved to different locations. The six-DOF probe 1260 and the line scanner 1270 may be electrically and mechanically connected through a connector 1269. Additional electrical connections may be provided through an electrical cable 1268 or through wireless signals.

Figure 13A:
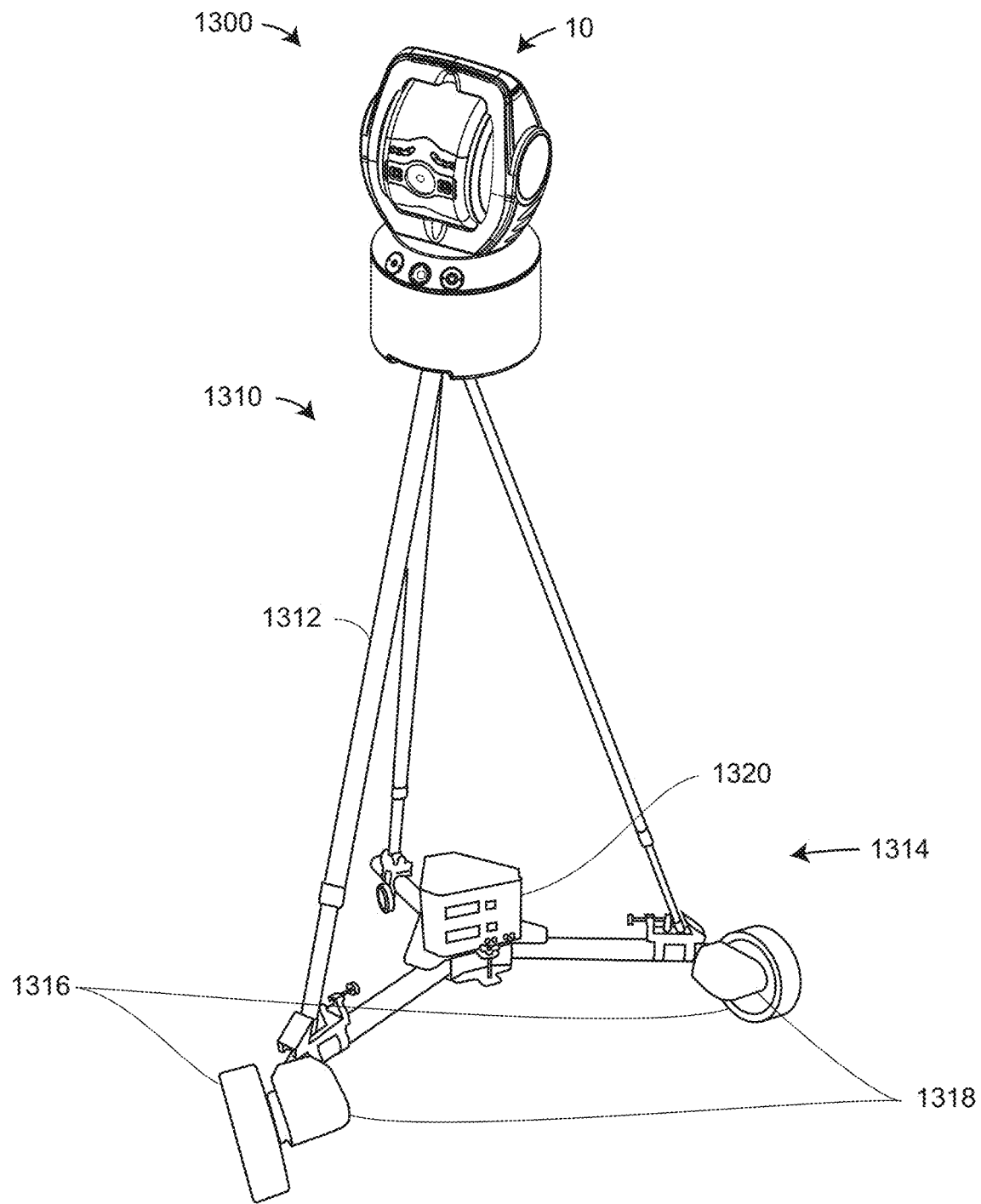
FIG. 13A is an isometric view of a tracker mounted on a motorized carriage according to an embodiment of the present invention.

In an embodiment illustrated in FIG. 13A, a laser tracker 10 may be part of a system 1300 operable to move the tracker 10 from location to location. In embodiments, the stand may be a portable stand pushed by an operator or a motorized stand under processor control. In an embodiment, the tracker 10 is mounted on a portable stand which is pushed by an operator from location to location. In another embodiment illustrated in FIG. 13A, the stand includes a motorized carriage 1314. In an embodiment, the motorized carriage 1314 includes a structural support 1312, a collection of wheels 1316, motors 1318 to turn the wheels 1316, and a controller 1314 to provide the signals to drive the wheels 1316.

A situation often encountered in making 3D measurements with a laser tracker is the need to measure an object from multiple sides. A way to do this is to place retroreflectors in kinematic nests in fixed locations around the object to be measured. As the measurement proceeds and the tracker is moved from the location to location, the tracker measures the 3D coordinates of at least three common retroreflectors from two different locations of the tracker. A mathematical procedure may then be performed to place any measurements made by the tracker in the first and second locations to be combined into a common frame of reference. There are many equivalent mathematical procedures for obtaining such a transformation of collected 3D values into a common frame of reference and the claims should not be so limited, but one term often used for obtaining such transformations is by means of "transformation matrices."

In some embodiments, the acceptance angle of a spherically mounted retroreflector is limited. For example, for an SMR 95 having a cube-corner retroreflector with three mutually perpendicular mirror reflectors in air, the acceptance angle of the SMR 95 is approximately +/−25 degrees, which is to say that if the retroreflector is tilted at a larger angle relative to the beam of light 90 from the laser tracker 10, the beam will begin to clip and eventually light will not be reflected into the laser tracker 10. To get around this potential issue as the tracker is moved from location to location, in prior art tracker systems a procedure was used where an operator rotated each SMR in each nest to face the laser tracker 10. For tracker measurements manually performed by an operator, such additional rotation slows down measurement. Embodiments provided herein provide advantages in allowing tracker measurements to performed automatically, some method is needed to automatically rotate the SMRs in each kinematic nest to face the tracker 10 as the tracker 10 moves from location to location.

In an embodiment, the SMR rotator illustrated in FIG. 7A, FIG. 7B, FIG. 8, FIG. 9, FIG. 10 and FIG. 11 may be used to obtain automatic, high accuracy tracker registration. To obtain high accuracy, in an embodiment, the SMR 95 is rotated while being kept in contact with a fixed kinematic nest. In this embodiment, the center of an SMR may be held at fixed 3D coordinates, as measured by the laser tracker 10, even as the SMR 95 is rotated.

Figure 13B:
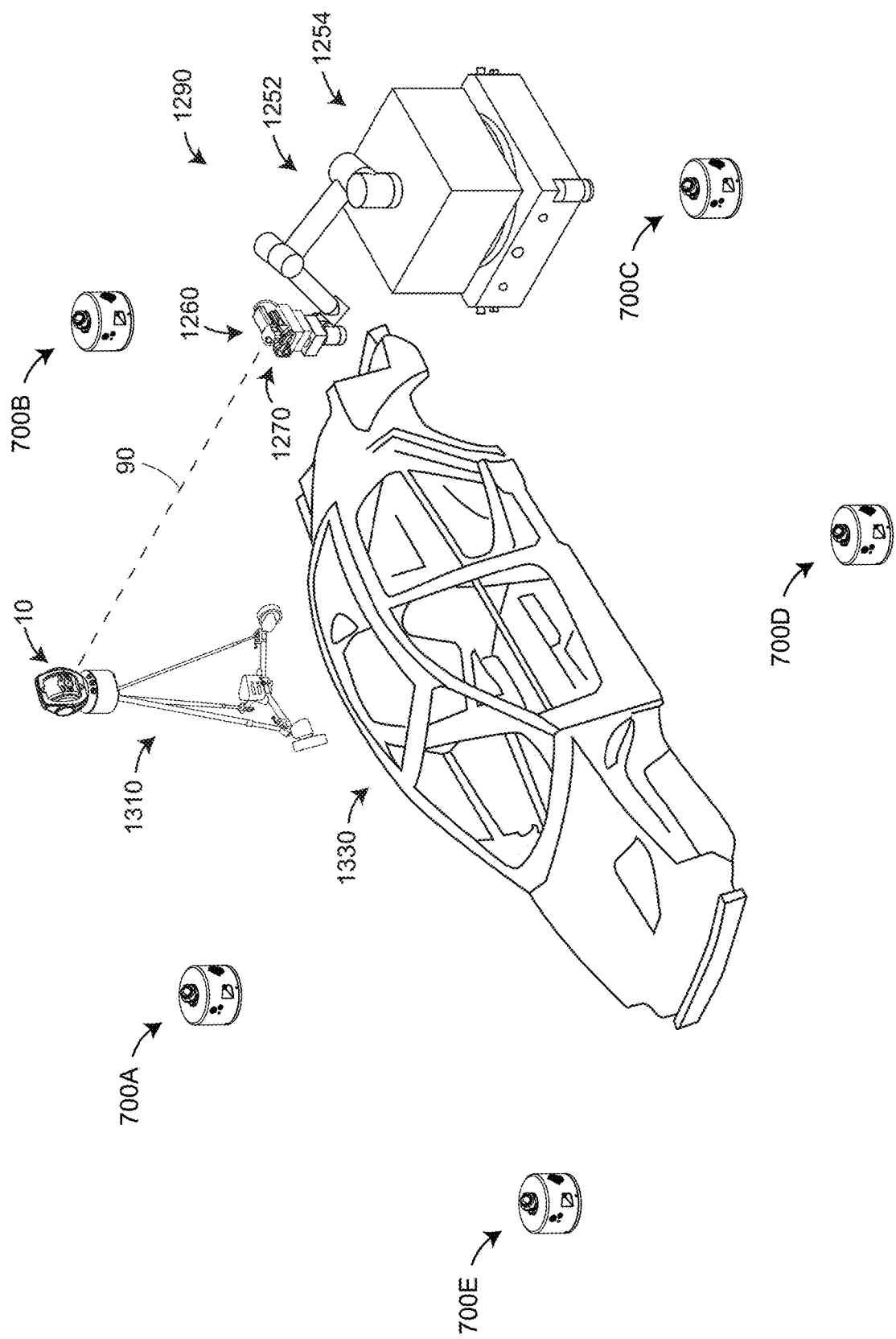
FIGS. 13B, 13C, 13D, 13E are isometric views of a laser tracker cooperating with a measurement assembly mounted on a mobile robot, with the laser tracker measuring SMRs from multiple views to determine the pose of the measurement assembly according to an embodiment of the present invention.

Some examples are now given for a few applications in which the SMR rotator 700 is usefully employed. In an embodiment illustrated in FIG. 13B, FIG. 13C, FIGS. 13D and 13E, a laser tracker 10 measures an object under test 1330, in this case an automobile body-in-white, with a laser tracker 10 moved on a motorized carriage 1310 around the object. To enable such a measurement to be performed automatically, each time the motorized carriage 1310 is moved, the tracker 10 reestablishes its frame of reference in relation to the frame of reference of the tracker 10 in each of its other locations. FIG. 13B illustrates the case in which a tracker 10 measures the six degrees-of-freedom of a six-DOF probe 1260, which is rigidly coupled to a line scanner 1270. The pose of the line scanner 1270 is known in relation to the pose of the six-DOF probe 1260. Hence, by measuring the six degrees of freedom of the six-DOF probe 1260 with the tracker, the six degrees-of-freedom of the line scanner 1270 is also determined. In an embodiment, the line scanner 1270 and six-DOF probe 1260 are both mounted on a multi-segment robotic arm 1252, which in turn is mounted on a mobile platform 1254. The mobile measurement system 1290 includes the six-DOF probe 1260, the line scanner 1270, the robotic arm 1252, and the mobile cart 1254. In other embodiments, other measuring devices are attached to the robotic arm 1252. In an embodiment, the mobile measurement system 1290 moves the robotic arm to measure features of interest on the object 1330 with the line scanner 1270, while measuring at the same time the six degrees-of-freedom of the line scanner 1270. The mobile platform 1254 moves to continue the measurements of the object 1330. When the six-DOF probe 1260 is outside the view of the laser tracker 10, the laser tracker 10 is moved to from its first location in FIG. 13B to its second location in FIG. 13D. To make this move without losing track of the pose of the line scanner 1270, a registration procedure is performed as illustrated in FIG. 13C and FIG. 13D.

Figure 13C:
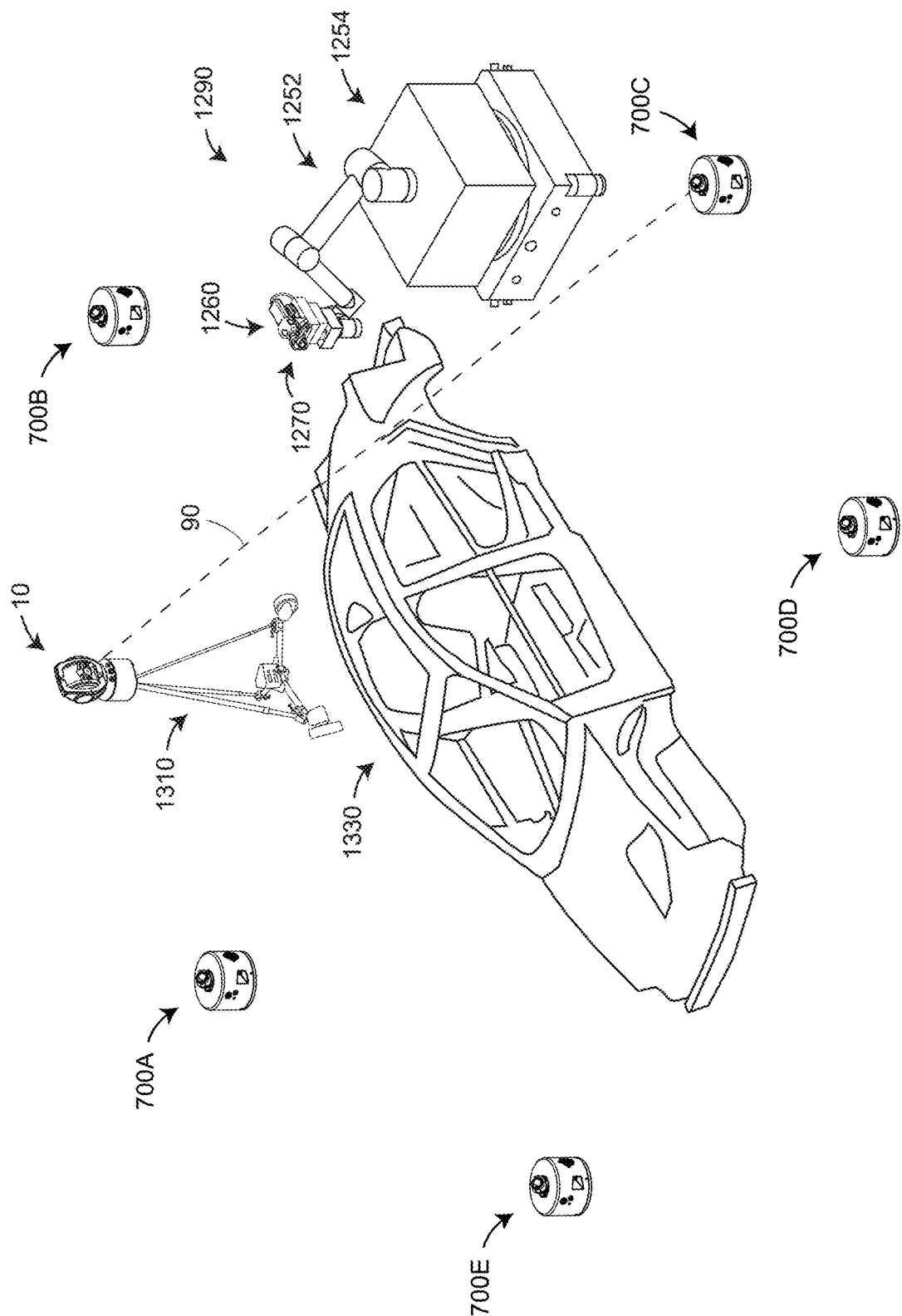
Figure 13D:
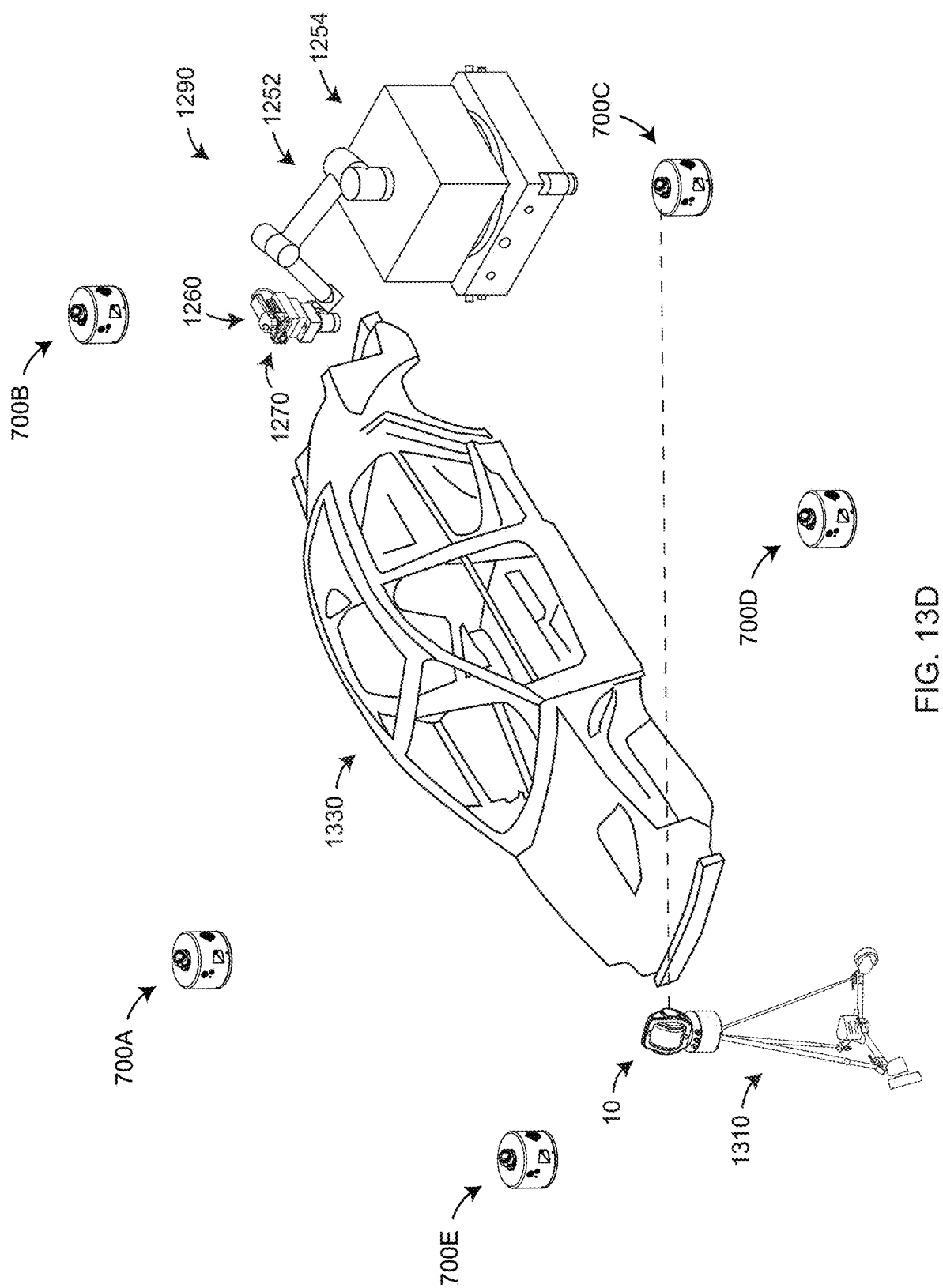

The laser tracker 10 is in a first location in FIG. 13C and is moved to a second location in FIG. 13D, for example, by activating the motorized carriage 1310 or by having an operator manually push the tracker 10 from the first location in FIG. 13C to the second location in FIG. 13D. While the laser tracker 10 is in the first location in FIG. 13C, the tracker measures the positions of SMRs in each of a collection of SMR rotators 700. FIG. 13C illustrates the case in which the tracker measures the 3D coordinates of the center of the SMR in the SMR rotator 700C. It continues by measuring the 3D coordinates of the centers of SMRs in a number of other SMR rotators such as the SMR rotator 700D, 700E, 700A, 700B. The SMR rotators 700 may be mounted on the floor (for example, by using hot glue) or may be attached to stands that raise the height of the SMR rotators 700. This decision is made according to the visibility of the SMRs in the SMR rotators 700 to the laser tracker 10 in each of its expected locations.

Following the measuring of the 3D coordinates of the SMRs in the setup of FIG. 13C, the laser tracker is moved to the second location as illustrated in FIG. 13D. FIG. 13D shows the laser tracker 10 again measuring the SMR in the SMR rotator 700C. The laser tracker continues to measure the SMRs in the other rotators such as the SMR rotators 700D, 700E, 700A, 700B. In an embodiment, the laser tracker 10 measures at least three common SMRs in the first location of FIG. 13C and the second location of FIG. 13D.

Figure 13E:
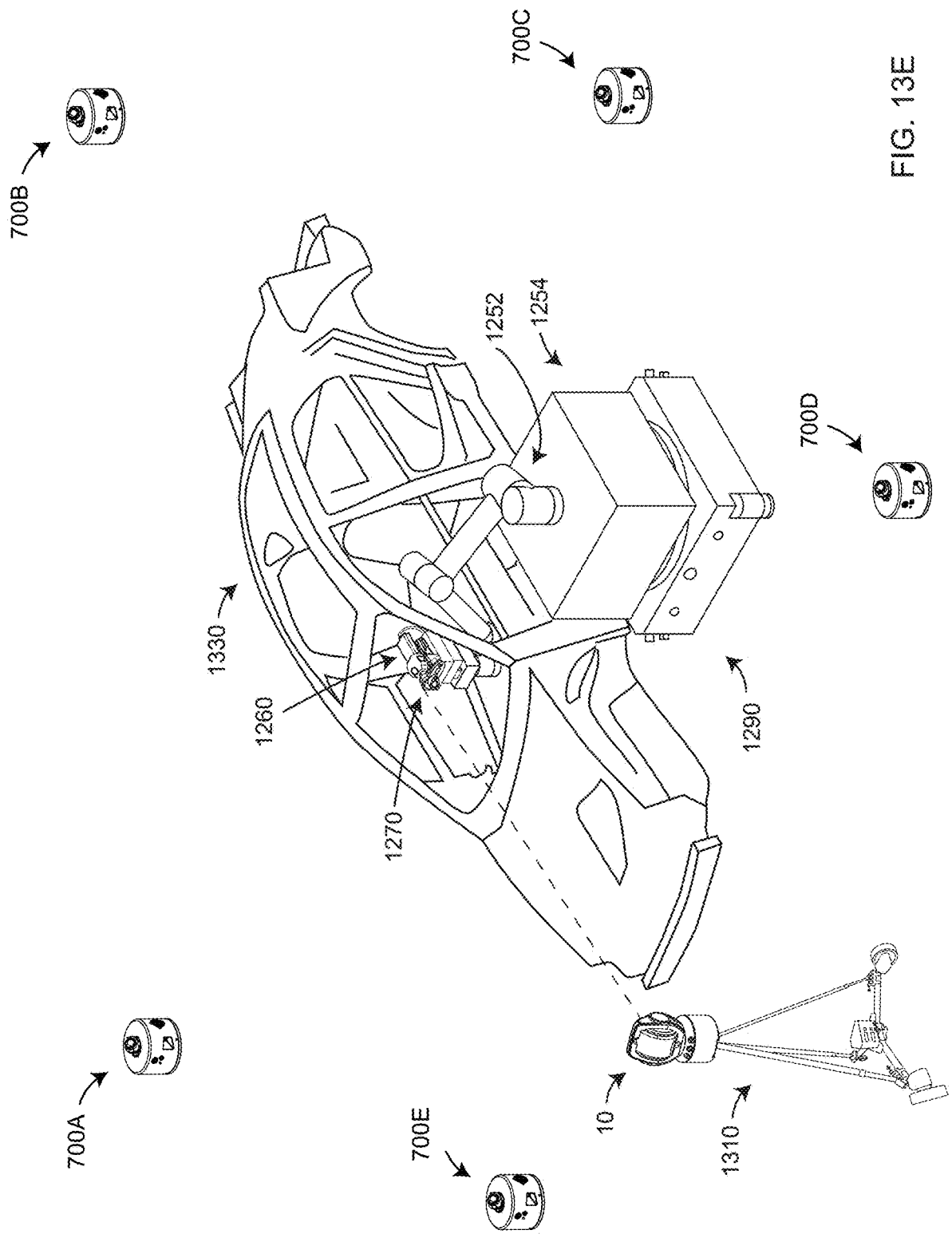

Besides moving the tracker 10 to the second location, the mobile measurement system 1290 also moves to a new location as shown in FIG. 13E. In the illustration of FIG. 13E, the tracker measures the six degrees of freedom of the six-DOF probe 1260, thereby placing the line scanner 1270 into position to measure interior features of the object 1330. In an embodiment, the determined 3D coordinates measured by the line scanner 1270 are transformed into the frame of reference of the tracker 10 in the second location of FIG. 13E based on the six-DOF measurements made by the tracker in combination with the six-DOF probe 1260.

The 3D coordinates of the object obtained by the tracker in FIG. 13B are then combined with the 3D coordinates of the objected obtained by the tracker in FIG. 13E by placing the measured 3D coordinates a common frame of reference. In an embodiment, a mathematical method is used to determine the six-DOF pose of the tracker in the second location of FIG. 13D and FIG. 13E in relation to the pose of the tracker in the first location of FIG. 13B and FIG. 13C. To do this, the tracker 10 at the first location and the second location must measure the 3D coordinates of at least three common SMRs 700. For example, the tracker in the first location of FIG. 13C and the second location of FIG. 13D may both measure the SMRs in SMR rotators 700A, 700C, 700E. Following these measurements of the SMRs in the SMR rotators, any 3D measurements of an object 1330 by the tracker in the first location of FIG. 13B or the second location of FIG. 13E may be placed in a common frame of reference. For example, the 3D measurements of the object 1330 by the laser tracker 10 at the second location of FIG. 13E may be transformed into the frame of reference of the laser tracker 10 at the first location of FIG. 13C. In another embodiment, the 3D measurements of the object 1330 by the tracker at the first location of FIG. 13C may be transformed into the frame of reference of the laser tracker 10 at the second location of FIG. 13D. In still another embodiment, the 3D measurements of the object 1330 by the tracker at the first and second locations may be transformed into a common frame of reference not corresponding to the frame of reference of the tracker at the first location or the second location. In the illustrated embodiment, the minimum requirement to perform a transformation into a common frame of reference is for 3D measurements to be obtained for three common SMRs in the first location of FIG. 13C and the second location of FIG. 13D. This method of combining measured 3D coordinates into a common frame of reference based on measurement of commonly positioned SMRs was described herein above in reference to FIG. 6.

Figure 13F:
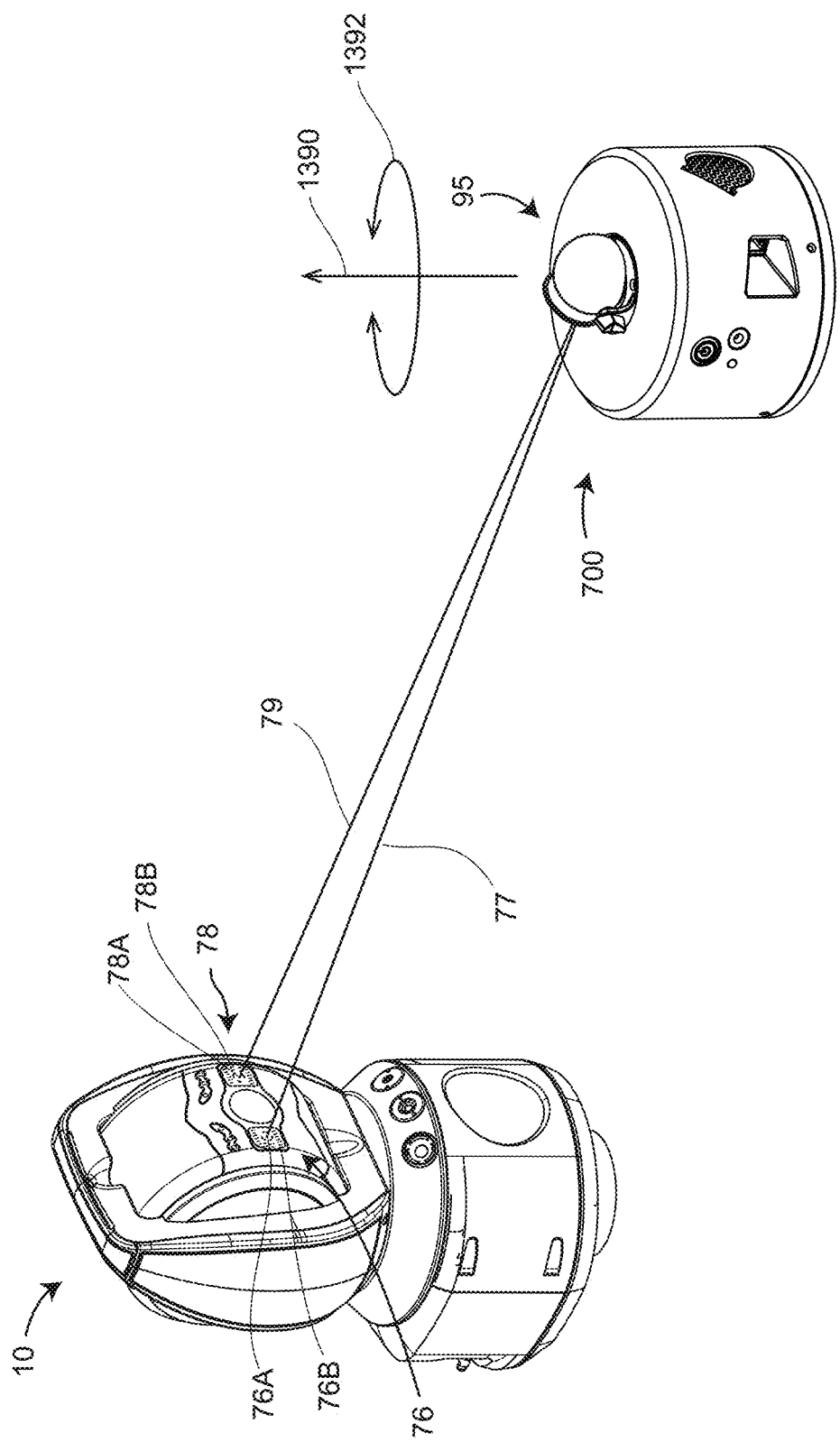
FIG. 13F is an isometric view of LEDs and cameras on a laser tracker being used to locate an SMR on an SMR rotator according to an embodiment of the present invention.

To measure 3D coordinates of a retroreflector 98 embedded in an SMR 95 with a laser tracker 10, the SMR 95 is positioned to face a laser beam 90 from the laser tracker 10 (e.g. the mirrored surfaces of the SMR are oriented in a direction towards the laser tracker 10). A method for rotating an SMR 95 with an SMR rotator 700 to face the laser tracker 10 is now described. In an embodiment, a laser tracker illuminates light sources such as the light sources 76B, 78B as illustrated in FIG. 3. Light from these light sources travel to retroreflectors and is reflected into cameras such as the cameras 76, 78. The light from the light sources 76B, 78B may be flashing to enable easy identification of retroreflectors in the images on the photosensitive arrays 76A, 76B of the cameras 76, 78. In an embodiment illustrated in FIG. 13F, a retroreflector 95 on an SMR rotator 700 is rotated about a vertical axis 1390 of the SMR rotator 1390. When the retroreflector rotates into a position to reflect some of the light from the light sources 76B, 78B as reflected beams 77, 79, respectively, into the cameras 76, 78, respectively, flashing spots appear on the photosensitive arrays 76A, 78A, respectively. When this occurs, in an embodiment, the laser tracker turns to face the retroreflector 95. In addition, in an embodiment, the SMR rotator continues to turn to face the cameras 76, 78. In response, the illuminated spots move toward the center of the photosensitive arrays 76A, 78A. In an embodiment, the tracker 10 locks onto the SMR 95 with a beam of light 90 from the laser tracker 10, as shown in FIG. 1. Lock on is achieved when the position-detector assembly 460 of the laser tracker 10 receives the reflected beam of light 92 and the tracker steering mechanism is adjusted to keep the beam centered on the position detector. Once lock-on occurs, the tracker 10 may measure the 3D coordinates of the SMR 95.

In an embodiment, the cameras 76, 78 have a field-of-view (FOV) of between 30 and 60 degrees. Any retroreflectors 95 within the FOV of the cameras 76, 78 are captured by the photosensitive arrays 76A, 76B whenever the SMRs 95 are rotated to approximately align with the cameras 76, 78. Hence, as the SMRs 95 are rotated about the axis 1390, they will appear as flashing spots of light on the photosensitive arrays 76A, 78A whenever they point toward the laser tracker 10. Once an acceptable rotation angle has been found for each SMR rotator 700, the SMR 95 may stop rotating and the tracker 10 used to measure the 3D coordinates of the centers of the SMR 95. If some SMRs are outside the FOV of the cameras 76, 78 on the laser tracker 10, the tracker may be rotated about the axes 12, 14 shown in FIG. 2 to look for SMRs 95 in different regions of space.

Figure 14:
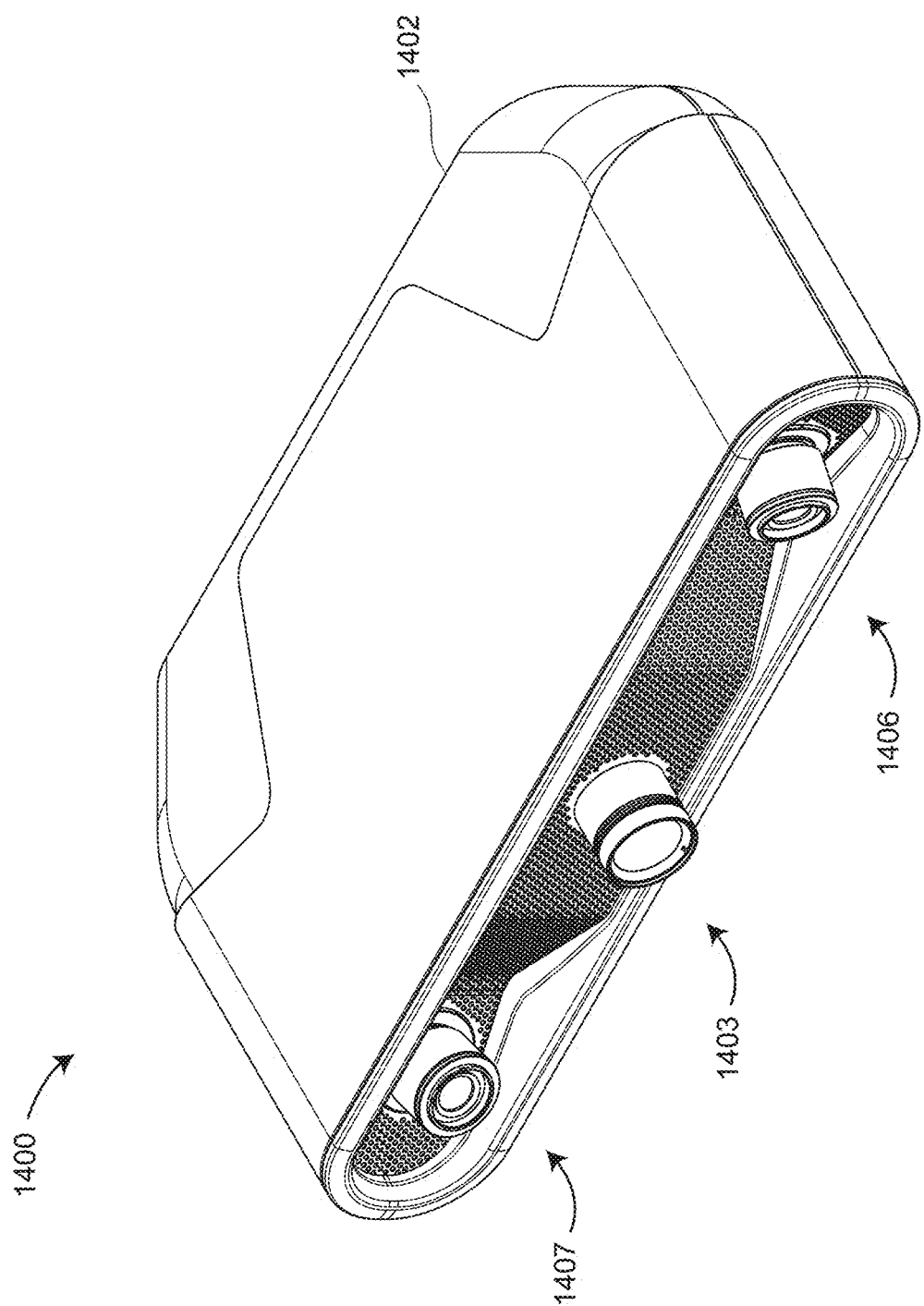
FIG. 14 is an isometric view of a triangulation scanner that projects light over an area according to an embodiment of the present invention.

FIG. 14 shows an exemplary triangulation scanner having a projector 1403 and two cameras 1406, 1407 installed in a frame 1402. In other embodiments, a triangulation scanner includes only one camera rather than two cameras. In an embodiment, the projector projects a pattern of light. Such a pattern of light may project pattern elements recognizable in images captured by the cameras 1406, 1407. By making a correspondence among the camera such as camera 1406, 1407 and pattern elements projected by a projector 1403, a triangulation calculation may be performed to determine 3D coordinates of the corresponding pattern elements as they appear on an object. To do the triangulation calculation, a baseline distance is established between the projector perspective center and a camera perspective center. Trigonometric relations are used to determine the 3D coordinates of the object point. In another embodiment, the corresponding pattern elements are recognized in images on each of the cameras 1406, 1407. A baseline distance between the two cameras 1406, 1407 is then used to perform a triangulation calculation to determine 3D coordinates of identified pattern elements on images captured by the cameras 1406, 1407. The method of matching pattern elements in two cameras or a projector and a camera enables 3D coordinates to be determined in a single shot.

More accurate methods than single-shot methods are possible if multiple patterns are projected and captured. In one example of such an approach, the optical power of projected light is varied sinusoidally, for example, with the light varying sinusoidally in intensity from left to right on an object surface. With this approach the sinusoidal pattern is shifted in phase from left to right, for example, to have phases of 0, 120, and 240 degrees. At each point on the photosensitive array of a camera such as a camera 1406, 1407, the level of the received light is determined. From the levels received for each of the phases, a correspondence may be determined between points projected by a projector such as the projector 1403 and the points captured by the camera or cameras such as 1406, 1407. A triangulation calculation in the multiple-image case may then be performed as in the single-shot case.

Figure 15A:
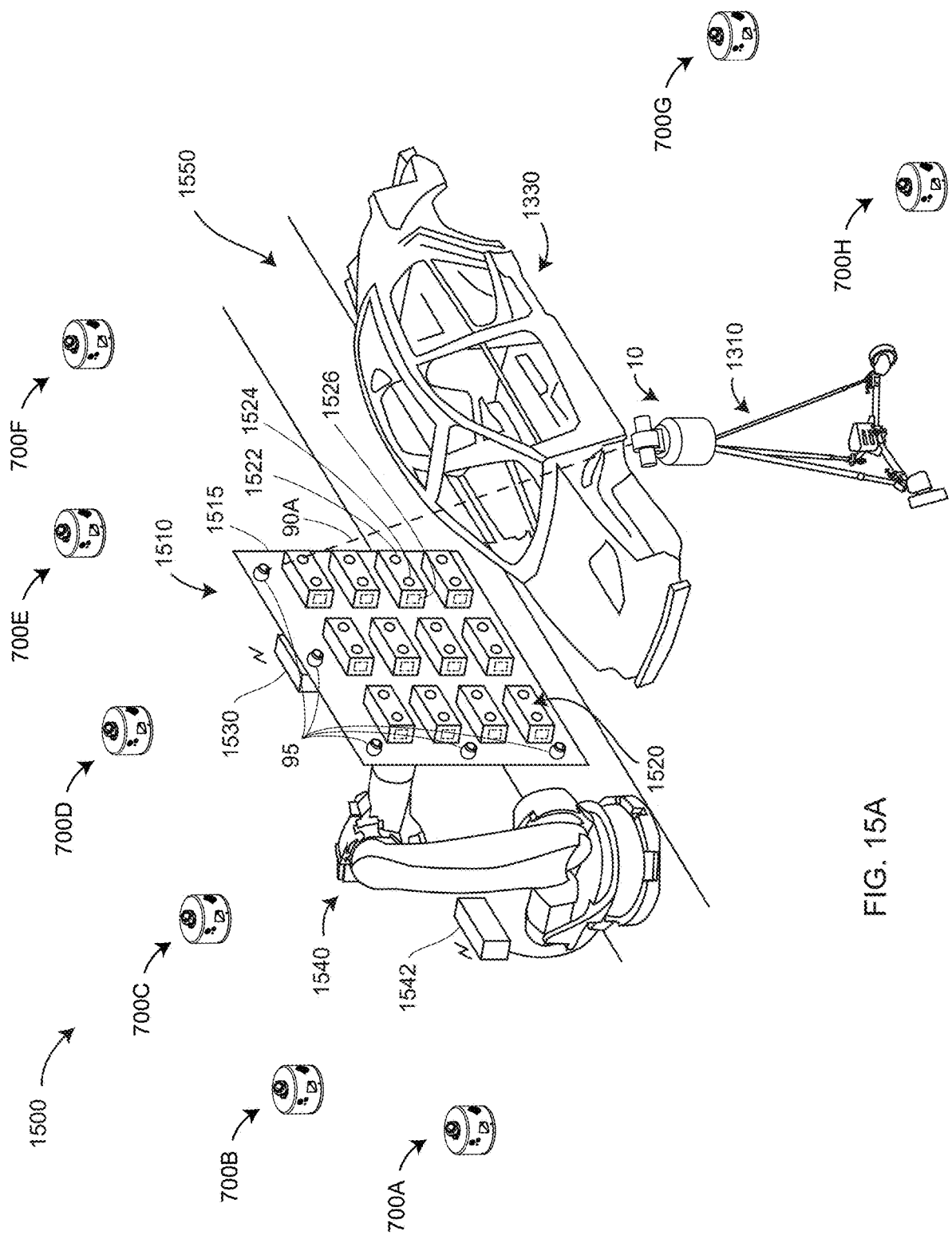
FIGS. 15A, 15B, 15C, 15D are isometric views of a laser tracker cooperating with an array of area triangulation scanners mounted on a robot and a collection of SMR rotators to measure 3D coordinates of an object with the robot moved to two different locations according to an embodiment of the present invention.

As a further example of how SMR rotators 700 may be usefully employed, a 3D measurement of points performed using an array 1510 of triangulation scanners is illustrated in FIG. 15A. In an embodiment, the array 1510 includes a plurality of triangulation scanners 1520 mounted on a structure 1515. In an embodiment, the triangulation scanner 1520 includes a projector 1522, a camera 1524, and a processor 1526. In an embodiment, the plurality of triangulation scanners 1520 are compensated so as to enable the captured 3D images to be combined into a single 3D image in a common frame of reference. In an embodiment, the plurality of triangulation scanners further cooperate with a processor 1530, which may connect with additional processors off the array 1510. In an embodiment, the structure 1515 is attached to an end effector of a robot 1540 operable to move the array 1510, enabling measurement of different portions of an object 1330 with the array of triangulation scanners. In an embodiment, a controller 1542 is used to control motion of the robot 1540. In an embodiment, the robot 1540 is moved along a track 1550.

Figure 15B:
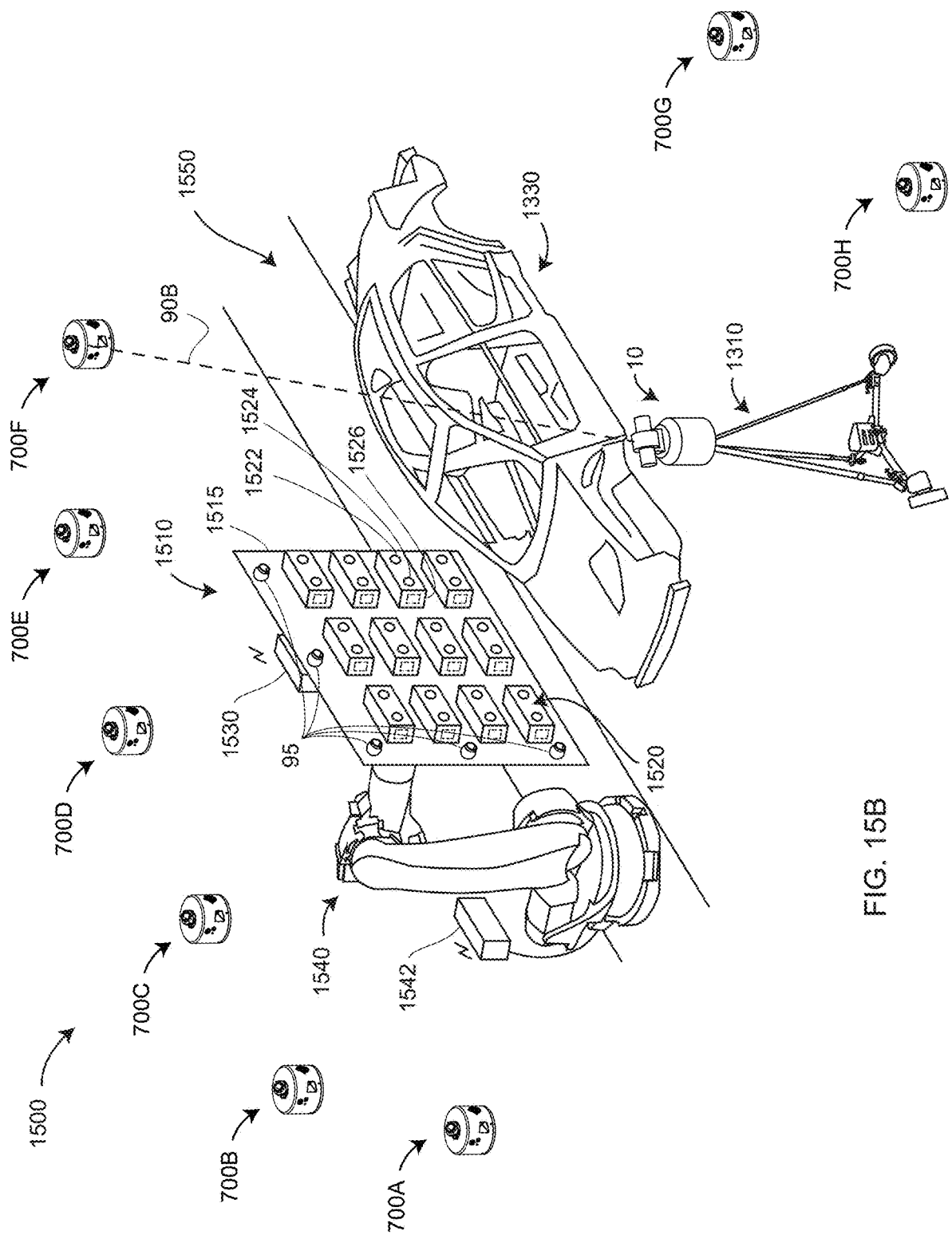
Figure 15C:
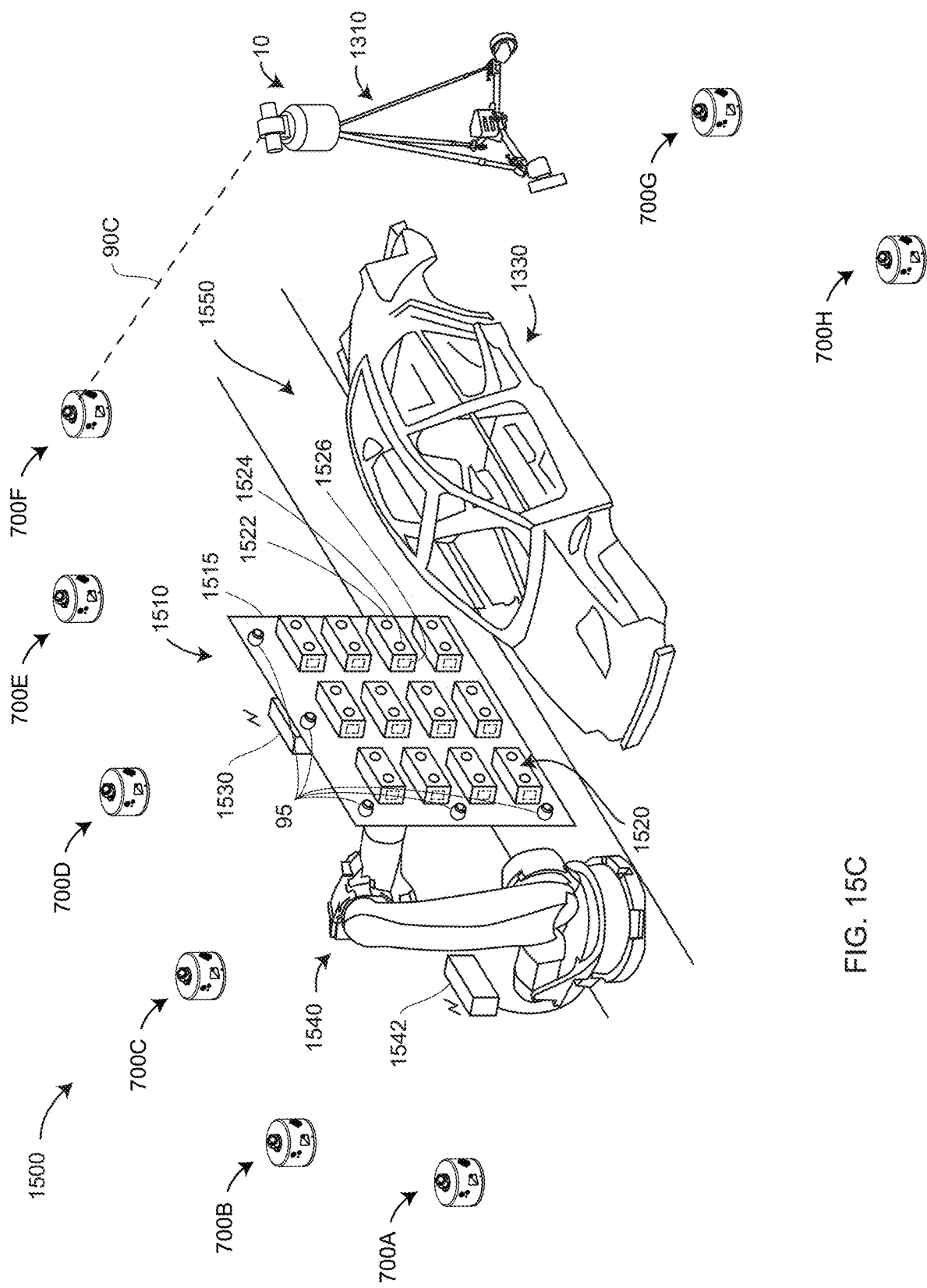
Figure 15D:
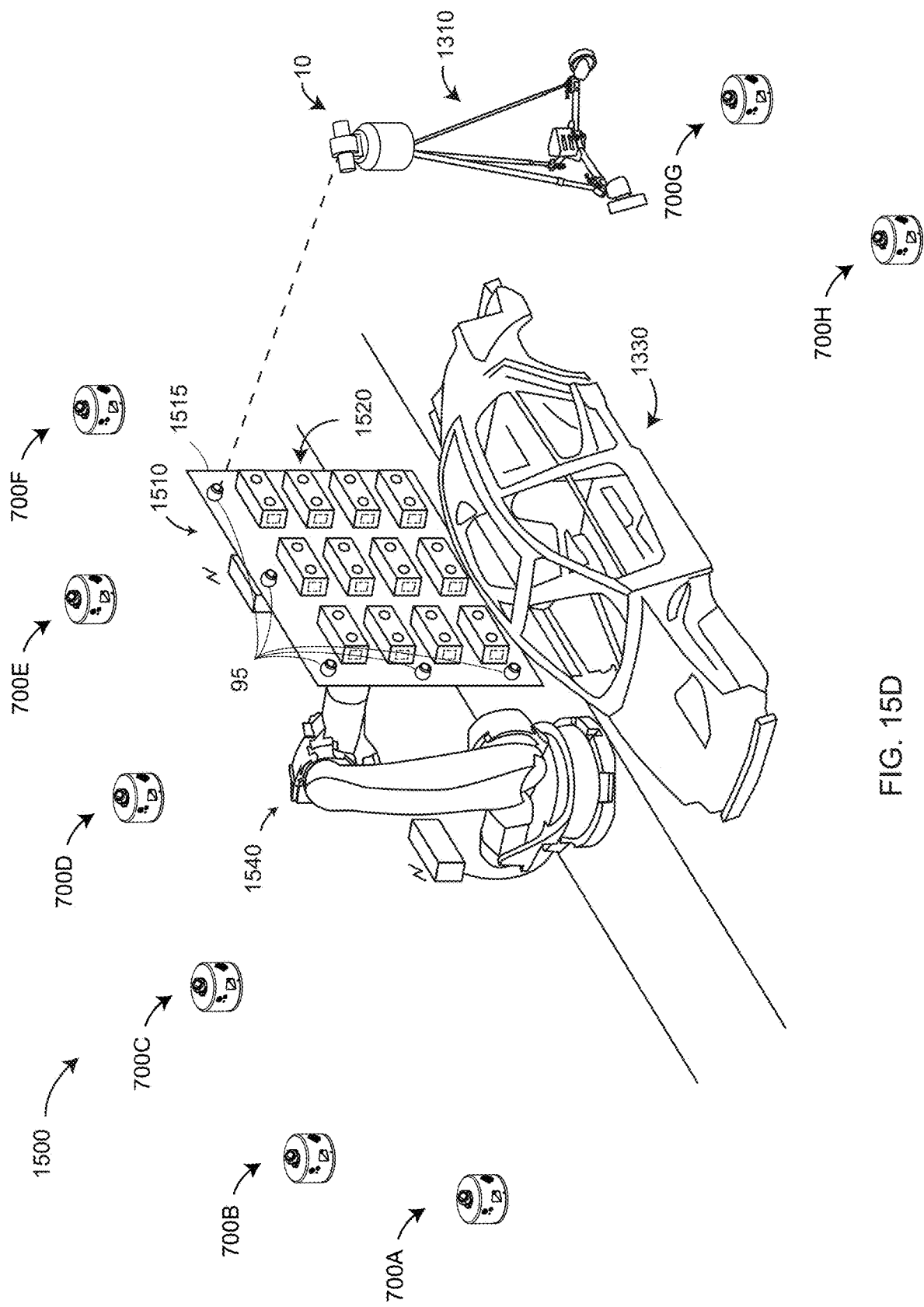

In an embodiment, a laser tracker 10 is moved from a first location in FIGS. 15A, 15B to a second location in FIGS. 15C, 15D. At the first location in FIG. 15A, the tracker measures three or more retroreflectors 95 on the structure 1515 as shown in FIG. 15A. In addition, in the first tracker location, the tracker 10 measures SMRs on three or more SMR rotators 700 as shown in FIG. 15B. Possible SMR rotators that may be measured include 700A, 700B, 700C, 700D, 700E, 700F, 700G, 700H. After 3D coordinate data has been collected by the array 1510 in the initial robot location shown in FIG. 15A, FIG. 15B and FIG. 15C, the robot 1540 is moved to a later robot location shown in FIG. 15D. In FIG. 15D, with the tracker 10 in its second location, the tracker 10 measures the 3D coordinates of SMRs 95 on the structure 1515. In addition, at the second tracker location, the tracker 10 measures the 3D coordinates of SMRs on a collection of SMR rotators 700 as shown in FIG. 15C. The 3D coordinates of at least three of the SMRs on the SMR rotators 700 are measured in common by the tracker in its first location and its second location. In an embodiment, these measured 3D coordinates are used by a processor to place any tracker measurements in the first and second tracker locations into a common frame of reference. In this way, the SMRs 95 measured by the tracker 10 in its first and second locations enable measurements performed by the array 1510 in the initial and final locations of the robot 1540 to be combined in a common frame of reference. In other words, in an embodiment, the tracker measurements performed as in FIG. 15A, FIG. 15B, FIG. 15C and FIG. 15D enable the 3D measurements obtained by the triangulation scanners 1520 with the array 1510 at two different robot locations to be combined in a common frame of reference.

Commonly owned U.S. Patent Application No. 62/595, 745 ('745), which is incorporated herein by reference, describes a method in which one or more cameras attached to a laser tracker may be used to obtain a 3D image showing edges of an object captured by the one or more cameras with the laser tracker positioned in three or more poses. The method described in the patent application '745 is applicable even to obtain 3D coordinates of continuous edges of objects, where no discrete points are identifiable in the multiple camera images captured in the three of more poses. A portion of the method described in the patent application '745 is to establish the relative pose of the laser tracker in each of the three or more poses. One way to determine the relative poses is to measure 3D coordinates of three or more common SMRs in each of the three or more tracker poses.

Figure 16:
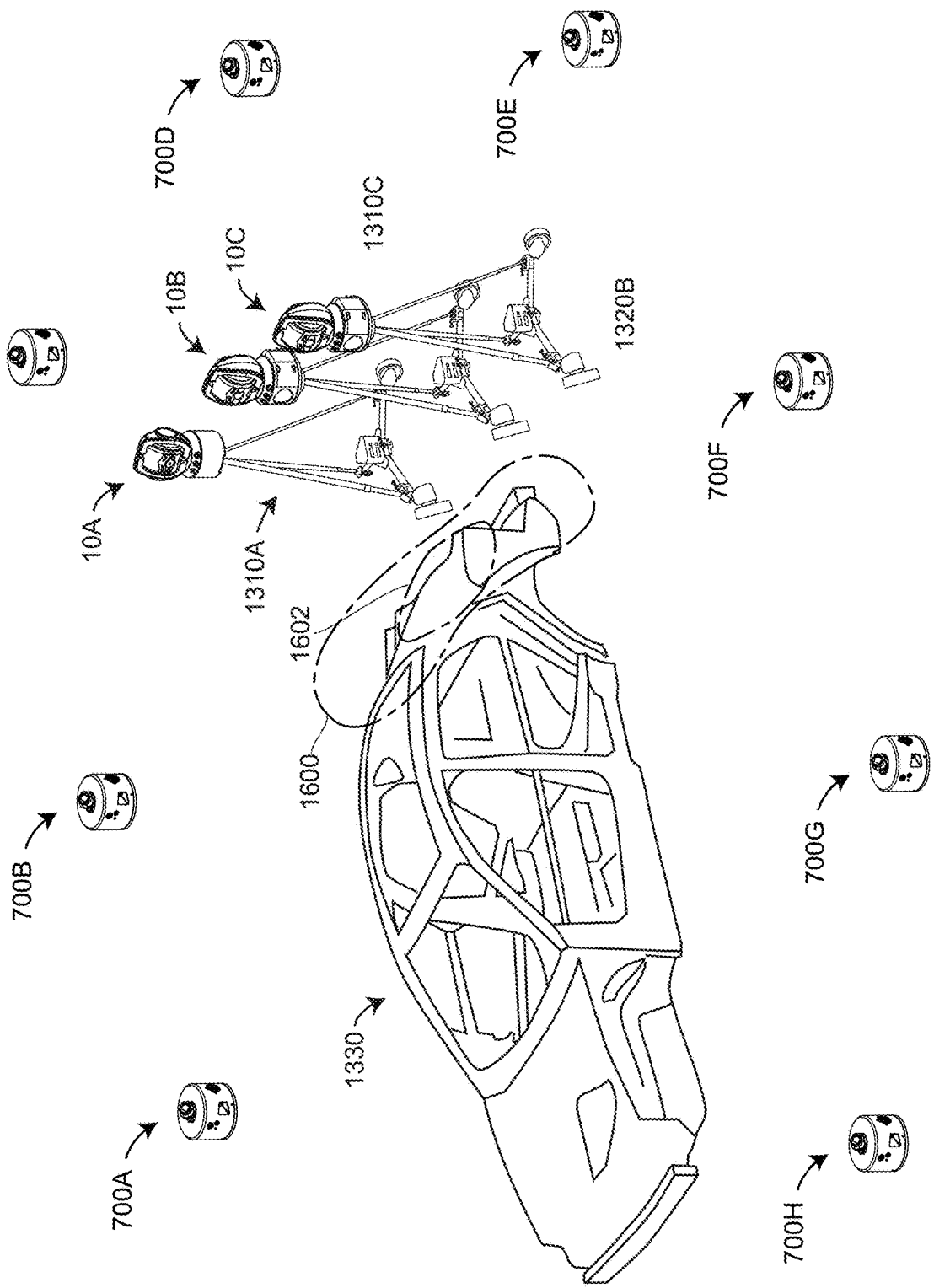
FIG. 16 is an isometric view of a tracker moved to three different locations, at each location obtaining camera images and measuring 3D coordinates of SMRs on SMR rotators as a way of determining 3D edges of an object according to an embodiment of the present invention.

In the method described in the patent application '745 the SMRs to be measured may not be facing the laser tracker attempting to measure their 3D coordinates. In other words, the laser tracker may not be aimed at the SMR to within the acceptance angle of the retroreflector of the SMR. A way around this difficulty is illustrated in FIG. 16. In an embodiment, a laser tracker 10 moves from a location A to a location B and then to a location C. This is indicated in FIG. 16 by labeling the tracker 10 at these three locations as 10A, 10B, and 10C. The tracker at each of these locations is mounted on a cart 1310, which may be pushed by hand or moved by a motorized mechanism. The cart 1310 holds the tracker 10 at the three locations A, B, C as indicated by labeling the cart at these locations 1310A, 1310B, 1310C, respectively. In an embodiment, the laser tracker 10 at the locations A, B, C captures with one or more of its cameras 2D images over a region 1600 of a portion 1602 of an object 1330. At each of the three poses of the tracker 10A, 10B, 10C, the tracker further measures three or more of SMRs on SMR rotators 700, which may be any of SMR rotators 700A, 700B, 700C, 700D, 700E, 700F, 700G, 700H in the example of FIG. 16. In each case, the SMR rotator rotates its SMR to face the laser tracker to enable the 3D coordinates of the SMR to be determined. With these 3D coordinates of the SMRs on the SMR rotators 700 obtained, in an embodiment, the edges of the portion 1602 of the object 1330 are determined and displayed, for example, according to the method of the patent application '745. In an embodiment, the laser tracker 10 continues to move around the object 1330 and to use its one or more cameras to obtain 3D images of the edges of the object 1330.

Figure 17A:
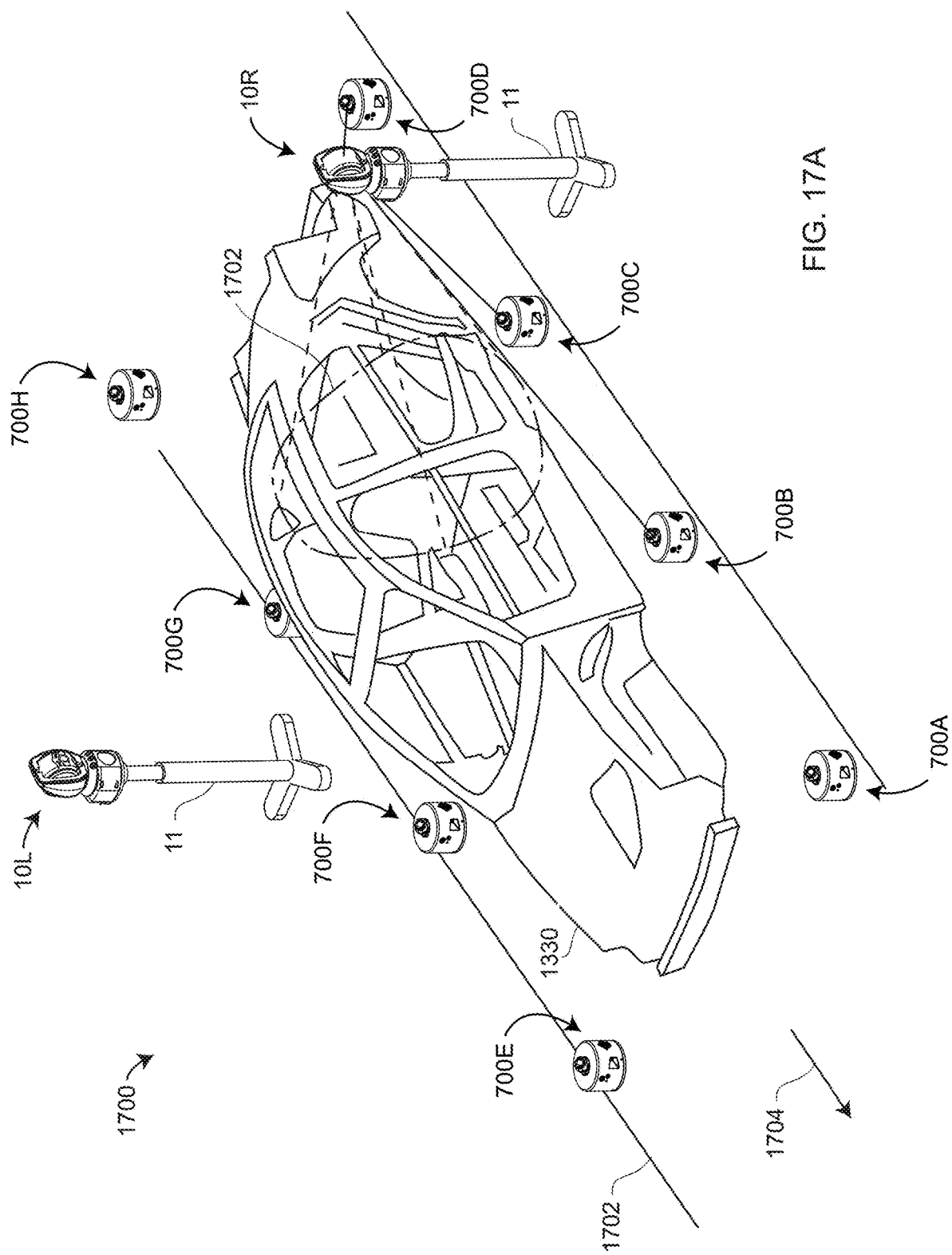
FIGS. 17A, 17B are isometric views of a tracker cooperating with an object and SMR rotators to obtain 3D images of edges of an object moving on a conveyor belt according to an embodiment of the present invention.
Figure 17B:
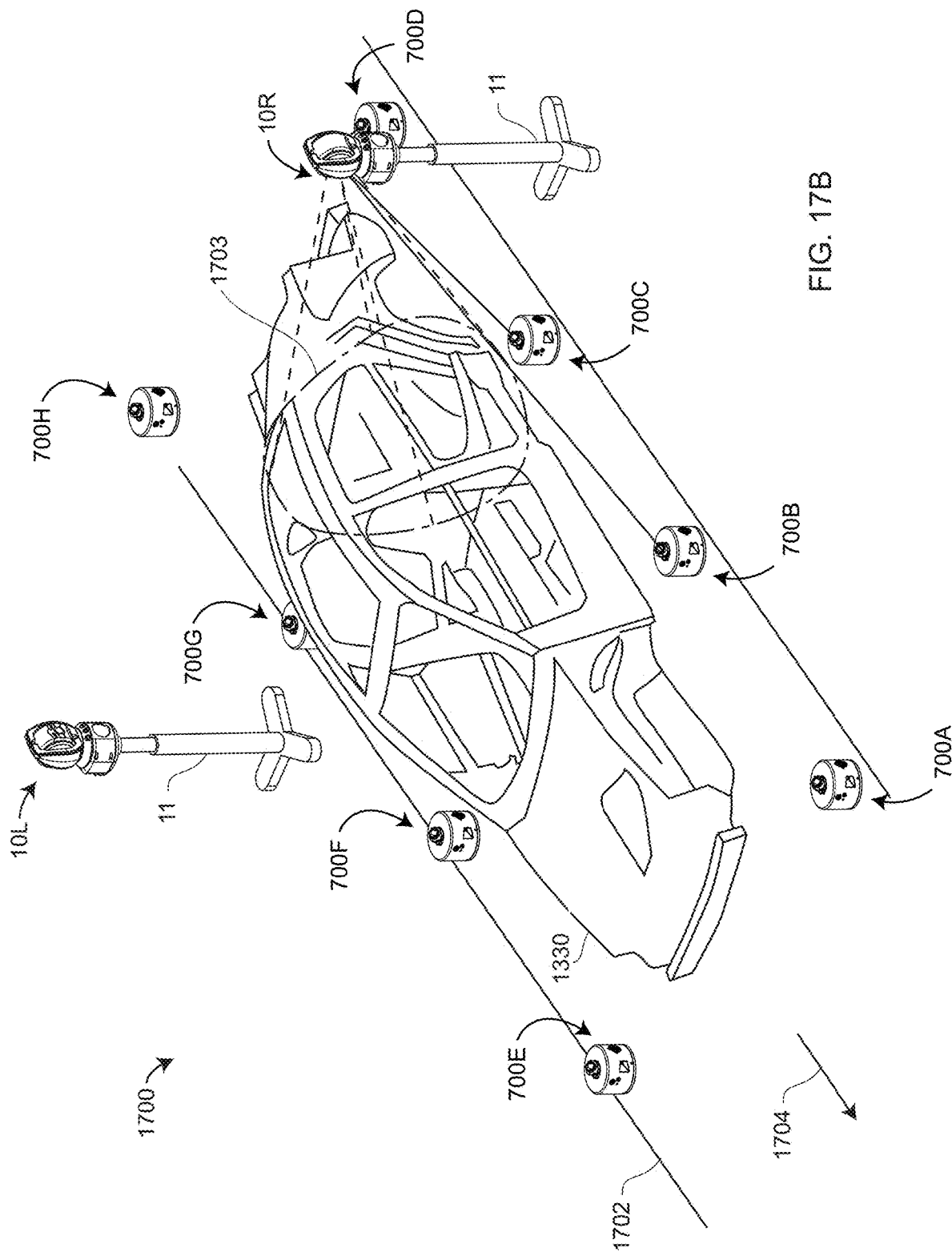

In an embodiment illustrated in FIG. 17A and FIG. 17B, the 2D images obtained from one or more cameras on a laser tracker 10 are again used to obtain a 3D image of an object 1330 according to the method described in patent application '745. In FIG. 17A, the object 1330 is moved past a first laser tracker 10R and a second laser tracker 10L. In an embodiment, the object 1330 is moved along by a conveyor belt 1702, which travels in a direction 1704, while the trackers 10R, 10L are stationary. In an embodiment, multiple SMR rotators 700 are placed on the conveyor belt 1702, for example, the SMR rotators 700A, 700B, 700C, 700D, 700E, 700F, 700G, 700H. In an embodiment, at a first location of the conveyor belt, the laser tracker 10R measures the 3D locations of SMRs in the SMR rotators 700B, 700C, 700D. With the conveyor belt at a new second location, the laser tracker 10L further captures 2D image of a portion 1702 of the object 1330 with its one or more cameras. In addition, it again measures the 3D coordinates of SMRs on the SMR rotators 700B, 700C, 700D. A processor uses the 3D coordinates of the SMRs in the SMR rotators 700B, 700C, 700D in the first location and the second location of the conveyor belt to move the 2D images for the regions 1702, 1703 into a common frame of reference. To finally obtain 3D coordinates for the edges of the object 1330, the method will be repeated to at least a third location in which the conveyor belt has further progressed in its path 1704. The 3D coordinates of the SMRs in the SMR rotators for at least three poses of the laser tracker relative to the moving conveyor belt 1702 is sufficient to enable the obtained 2D images to be converted to 3D coordinates of edge points, even continuous edge points.

Figure 18:
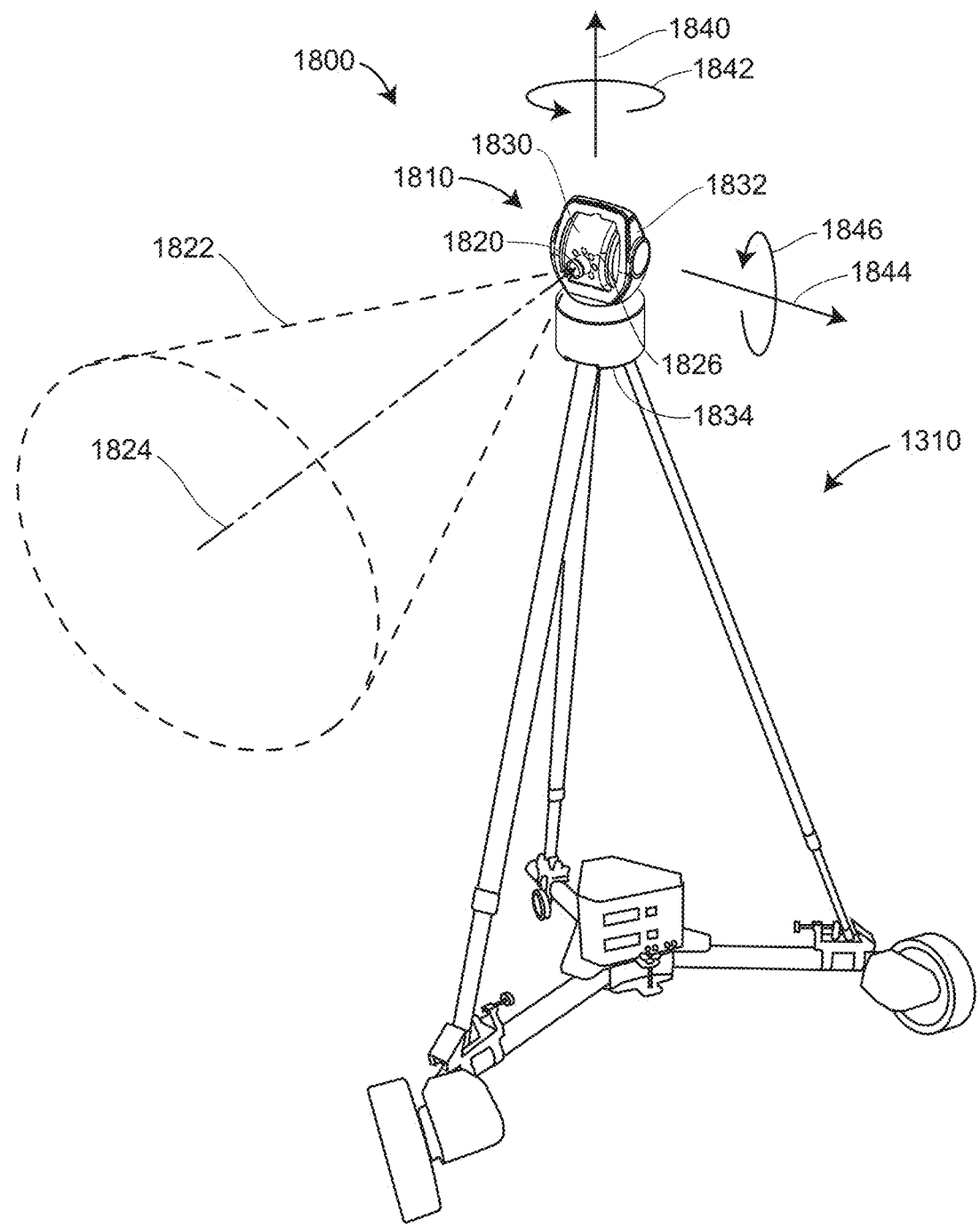
FIG. 18 is an isometric view of a rotating camera assembly according to an embodiment of the present invention.

FIG. 18 shows an embodiment in which a rotating camera assembly 1800 includes a rotating camera 1810 mounted on a cart 1310, which might be a motorized cart. In an embodiment, the rotating camera 1810 includes a camera 1820 coupled to a payload assembly 1830 that rotates in a rotation pattern 1846 about a horizontal axis 1844, as shown in FIG. 18. The payload assembly 1830 is in turn mounted on a yoke assembly that rotates in a rotation pattern 1842 about a vertical axis 1840 to a tracker base 1834. The yoke assembly rotates relative a base 1834, which is stationary relative to the cart 1310. In an embodiment, the rotating camera 1810 further includes one or more light sources 1826 proximate the camera 1820. Such light sources 1826 may be used to illuminate a reflector such as a retroreflector. Light reflected by the illuminated reflector may then appear in an image of the camera 1820. The payload 1830 and yoke 1832 may be turned by motors, with the angles of rotation measured to relatively high accuracy with angular transducers such as angular encoders similar to those found in the laser tracker 10. Hence the rotating camera assembly 1810 may cover a wide system field-of-view (FOV) by rotating about the axes 1840, 1844 to relatively accurate angles while at the same time obtaining high resolution 2D image data by restricting the camera FOV 1822 to a small angular value about a camera pointing direction 1824. In this way, the rotating camera assembly 1810 may obtain relatively higher accuracy image data over a wider FOV than is possible within an ordinary stationary camera.

Figure 19:
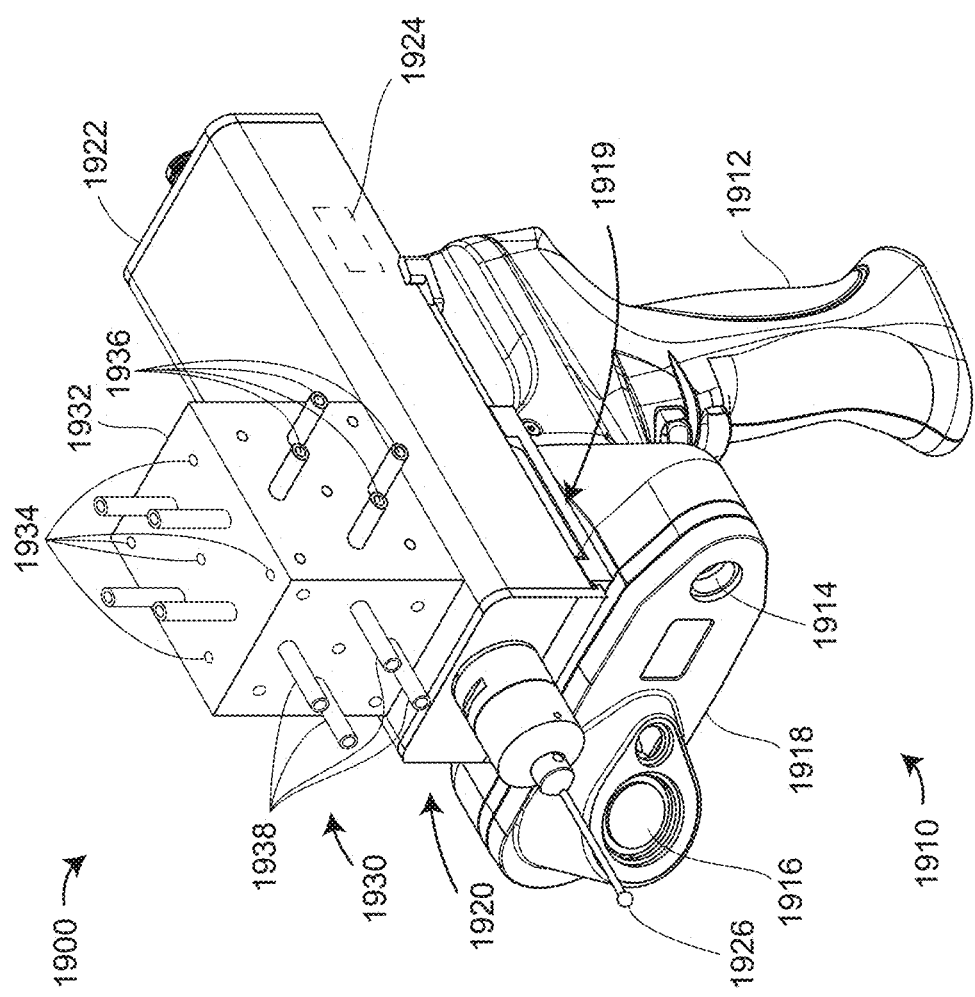
FIG. 19 is an isometric view of a handheld measuring device according to an embodiment of the present invention.

FIG. 19 shows a 3D measuring device 1900 having a handheld triangulation line scanner 1910, on which is mounted an electronics assembly 1920 and a light target array 1930. In an embodiment, the handheld triangulation line scanner 1910 includes a handle 1912 and a triangulation line scanner comprising a projector 1914 and camera 1916 mounted in a frame 1918. In an embodiment, an optional electronics assembly 1920 is attached to the line scanner 1910 through an electrical and mechanical interface 1919, as shown in FIG. 19. In an embodiment, the electronics assembly 1920 includes in a body 1922 that houses the electronics used to support the line scanner 1910 and the light target array 1930. In an embodiment, elements of the electronics assembly 1920 include a processor 1924, a frame, and optionally a tactile probe tip 1926. In an embodiment, the light target array 1930 is mounted on the electronics assembly 1920. In an embodiment, the light target assembly includes a structure 1932 on which are mounted targets such as the targets 1934 and targets 1936. In an embodiment, the targets 1934 are light sources such as LEDs mounted on the structure 1932, and the targets 1936 are light sources mounted on pedestals 1938. In other embodiments, the targets are not light sources but instead are small retroreflectors or target elements made of a reflective material.

Figure 20B:
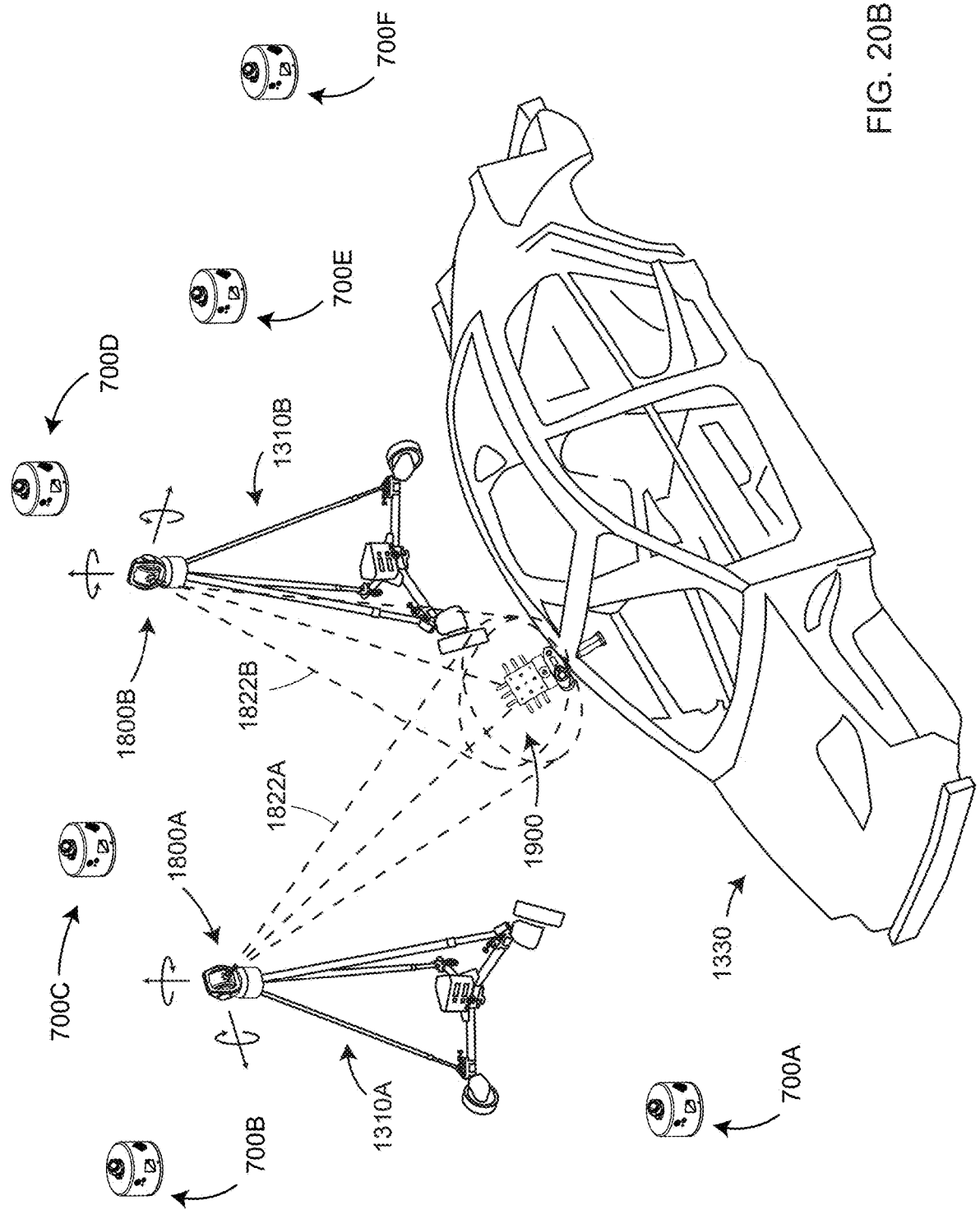

In an embodiment illustrated in FIGS. 20A, 20B, a first rotating camera assembly 1800A and a second rotating camera assembly 1800 B cooperate with a 3D measuring device 1900 to determine 3D coordinates of an object 1330. In an embodiment, the first rotating camera assembly 1800A and the second rotating camera assembly 1800B measure at least three common SMRs that are rotated on SMR rotation assemblies 700, which may include 700A, 700B, 700C, 700D, 700E, 700F, for example. In FIG. 20A, the rotating camera assemblies 1800A, 1800B are each measuring 3D coordinates of an SMR in the SMR rotator 700A. In an embodiment, the rotating camera assemblies are mounted on carts 1310A, 1310B, respectively. FIG. 20B shows the rotating camera assemblies 1310A, 1310B measuring targets on the light target array of the 3D measuring device 1900. By each of the rotating camera assemblies 1310A, 1310B having measured 3D coordinates of at least three common SMRs on the SMR rotation assemblies 700, the pose of the cameras of the rotating camera assemblies 1310A and 1310B may be put into a common frame of reference by a processor. This enables the baseline distance between perspective centers of the cameras in the rotating camera assemblies 1310A, 1310B to be determined and in addition the relative orientation of the cameras in the rotating camera assemblies 1310A, 1310B to be determined. This information enables a processor to perform triangulation calculations to the 2D images obtained by the cameras in the rotating camera assemblies 1310A, 1310B. The result of such calculations is 3D coordinates of points on the object 1330 measured by the 3D measuring device 1900. Such 3D measurement of points on the object may be obtained even as the 3D measuring device 1900 is moved from location to location, measuring different portions of the object 1330.

In other embodiments, the SMRs held by the SMR rotators may be replaced with spherical target elements that included centered light sources, such as LEDs, or centered reflective targets, such as circular reflective targets. Such spherical target elements include at least a portion of a spherical surface—for example, a hemisphere. In an embodiment, SMRs may be mixed with spherical target elements having light sources or reflective targets. In such cases, a laser tracker 10 may be used to measure the 3D coordinates of the SMRs in the SMR rotators 700 to establish 3D coordinates of some SMRs in an environment. Such 3D measurements may be used to establish scaled measurements by rotating camera assemblies such as 1800A, 1800B. As a rule of thumb, by measuring six such spherical target elements with a rotating camera assembly 1800A, the pose of a rotating camera assembly 1800A may be robustly determined relative to a rotating camera assembly 1800B. In an embodiment, rotating camera assemblies 1800A, 1800B further measure targets mounted on background structures such as walls or on test objects to obtain a large number of 3D coordinates within the environment.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus comprising:
a kinematic nest operable to support a first element, the first element having a spherical surface;
a rotation mechanism operable to rotate the first element on the kinematic nest while the spherical surface retains contact with the kinematic nest; and
a first processor operable to activate the rotation mechanism.

2. The apparatus of claim 1, wherein the first element includes an embedded retroreflector.

3. The apparatus of claim 2, wherein the first element includes a spherically mounted retroreflector having a cube-corner retroreflector, the cube-corner retroreflector having a vertex centered on the spherical surface.

4. The apparatus of claim 1, wherein the first element includes an embedded light source.

5. The apparatus of claim 1, wherein a center of the spherical surface remains fixed relative to the kinematic nest while the first element is rotated on the kinematic nest.

6. The apparatus of claim 1, wherein the rotation mechanism includes a motor and a first gear, the motor operable to rotate the first gear.

7. The apparatus of claim 1, wherein the first gear is operable to rotate the first element.

8. The apparatus of claim 7, wherein the first gear is operable to turn a second gear, the second gear being operable to rotate the first element.

9. The apparatus of claim 1, wherein the apparatus further comprises an attachment bracket coupled to an adjustment mechanism, the attachment bracket being operable to hold the first element in a selected orientation, the selected orientation being based on an adjustment of the adjustment mechanism.

10. The apparatus of claim 2, wherein the first processor is in communication with a second processor coupled to a laser tracker, the second processor sending a first signal to the first processor, the first processor operable to activate the rotation mechanism in response to the first signal.

11. The apparatus of claim 10, wherein the first signal is a wireless signal or a wired signal.

12. The apparatus of claim 10, wherein the apparatus is operable to receive the first signal and, in response, to activate or deactivate the rotation mechanism.

13. The apparatus of claim 12, wherein the laser tracker includes a light source and a camera, light emitted by the light source being reflected by the retroreflector and received by the camera when the retroreflector is positioned within a first range of angles relative to the camera, the second processor sending the first signal to the first processor based at least in part on the reflected light received by the camera.

14. A method comprising:
providing a system processor;
providing a collection of at least three devices, each device having a kinematic nest, rotation mechanism, and device processor, each device coupled to a first element having a spherical surface, the rotation mechanism operable to rotate the first element on the kinematic nest while holding the spherical surface in contact with a kinematic nest; and
sending a signal from the system processor to the device processor in one of the devices and, in response, rotating the first element with the rotation mechanism.

15. The method of claim 14, wherein, for each device in the collection, a center of the spherical surface remains fixed in space relative to the kinematic nest while the first element is being rotated.

16. The method of claim 14, wherein each first element includes an embedded retroreflector.

17. The method of claim 16, further comprising:
providing a laser tracker coupled to the system processor;
sending a signal from the system processor to each of the devices and, in response, rotating each retroreflectors to face the laser tracker;
measuring with the laser tracker first three-dimensional (3D) coordinates of each retroreflector; and
determining with the system processor a first pose of the laser tracker in relation to the at least three retroreflectors, the first pose based at least in part on the first 3D coordinates.

18. The method of claim 17, further comprising:
changing the location of the laser tracker relative to the collection of devices from a first location to a second location;
sending a signal from the system processor to each device and, in response, rotating each retroreflector to face the laser tracker;
measuring with the laser tracker second 3D coordinates of each retroreflector; and
determining with the system processor a second pose of the laser tracker in relation to the at least three retroreflectors, the second pose based at least in part on the second 3D coordinates.

19. The method of claim 18, further comprising:
measuring with the laser tracker initial 3D coordinates with the laser tracker in the first pose;
measuring with the laser tracker subsequent 3D coordinates with the laser tracker in the second pose; and
transforming with the system processor initial 3D coordinates and subsequent 3D coordinates to a common frame of reference based at least in part on the measured initial 3D coordinates, the measured subsequent 3D coordinates, the determined first pose, and the determined second pose.

20. The method of claim 19, further comprising:
measuring with the laser tracker in the first pose starting 3D coordinates with a six degree-of-freedom (DOF) probe;
measuring with the laser tracker in the second pose ending 3D coordinates with the six DOF probe;
transforming with the system processor initial 3D coordinate and subsequent 3D coordinates to a common frame of reference based at least in part on the measured starting 3D coordinates, the measured ending 3D coordinates, the determined first pose, and the determined second pose.

21. The method of claim 14, wherein each first element includes a light source or a reflective target.

* * * * *